March 17, 1970  F. H. OSBORNE ET AL  3,501,153
CHANGER AND SELECTOR MECHANISM
Filed March 1, 1967  21 Sheets-Sheet 1
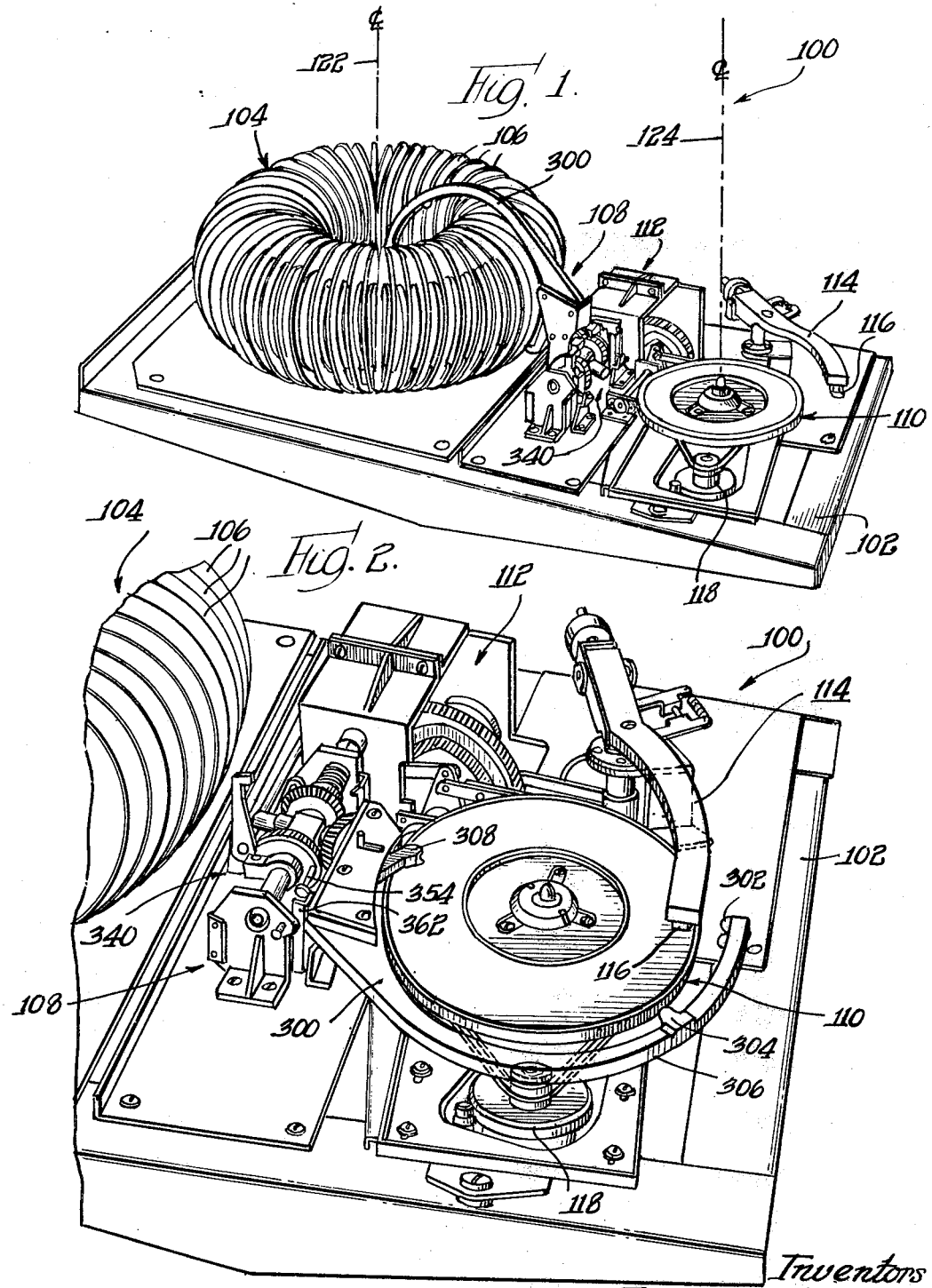
Inventors
Fred H. Osborne
Robert S. Tuttle
Michael J. Corbett
By: Olson, Trexler, Wolters & Bushnell attys.

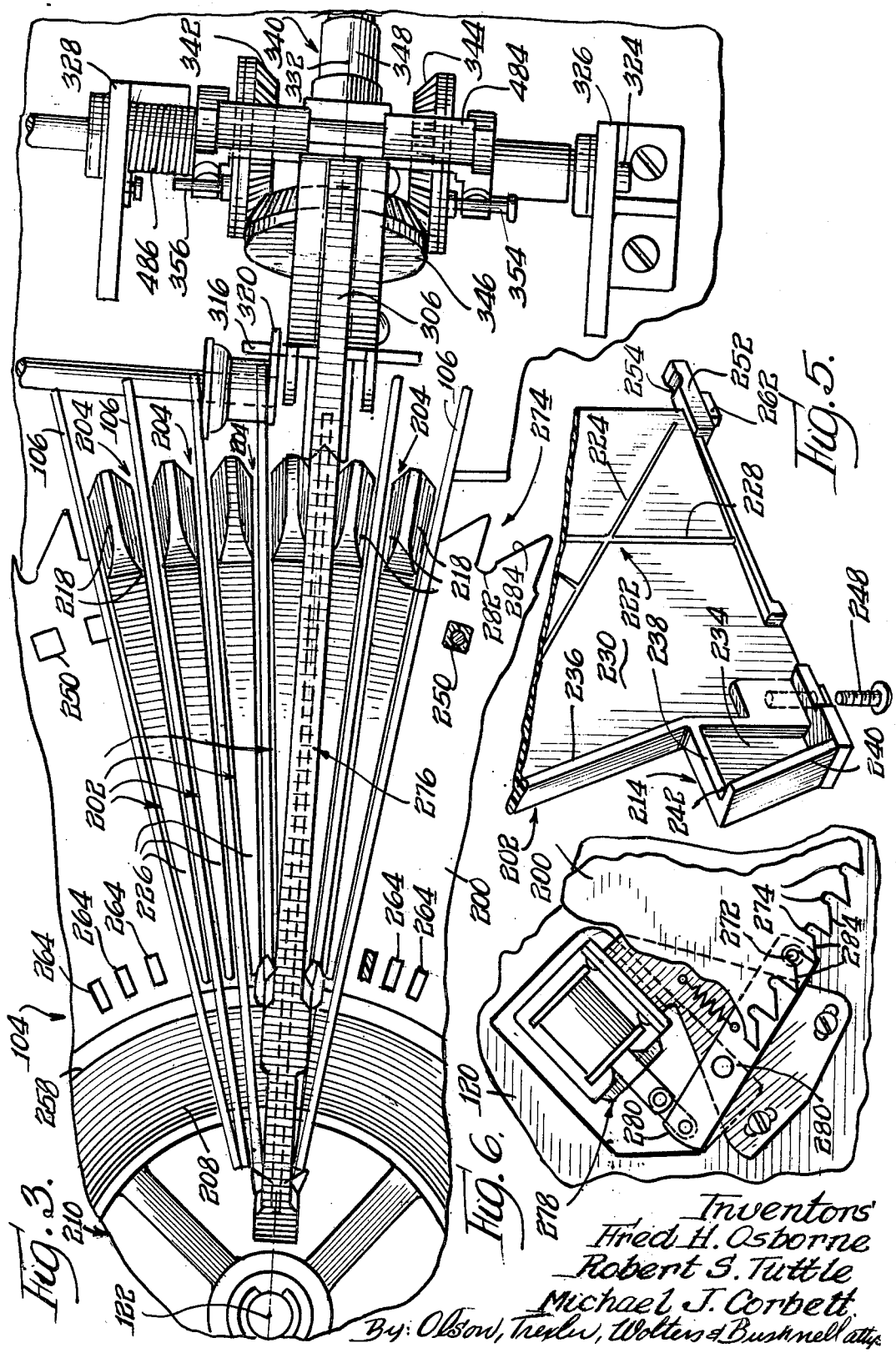

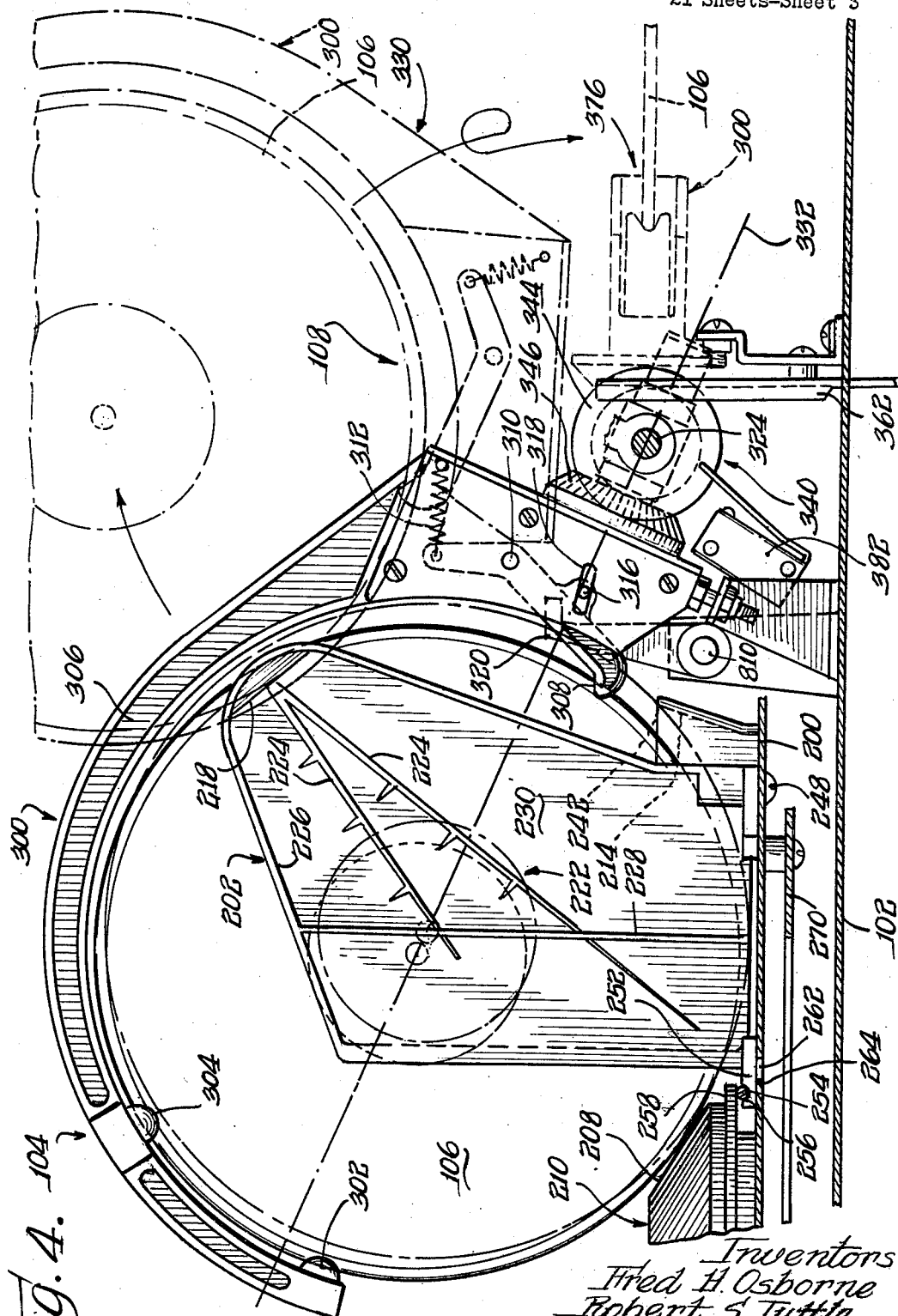

March 17, 1970   F. H. OSBORNE ET AL   3,501,153
CHANGER AND SELECTOR MECHANISM
Filed March 1, 1967   21 Sheets-Sheet 4

Inventors
Fred H. Osborne
Robert S. Tuttle
Michael J. Corbett
By: Olson, Trexler, Wolters & Bushnell attys.

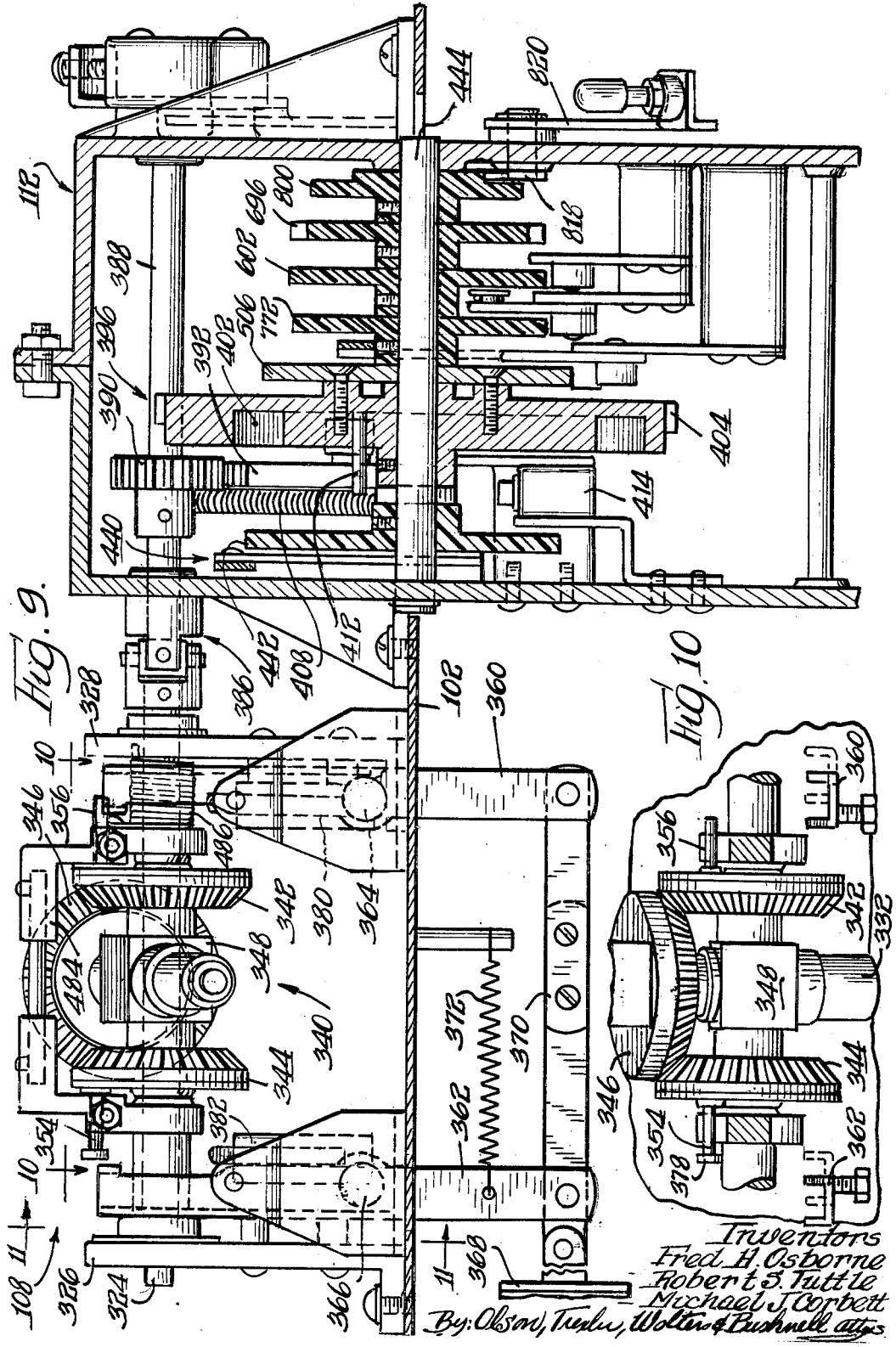

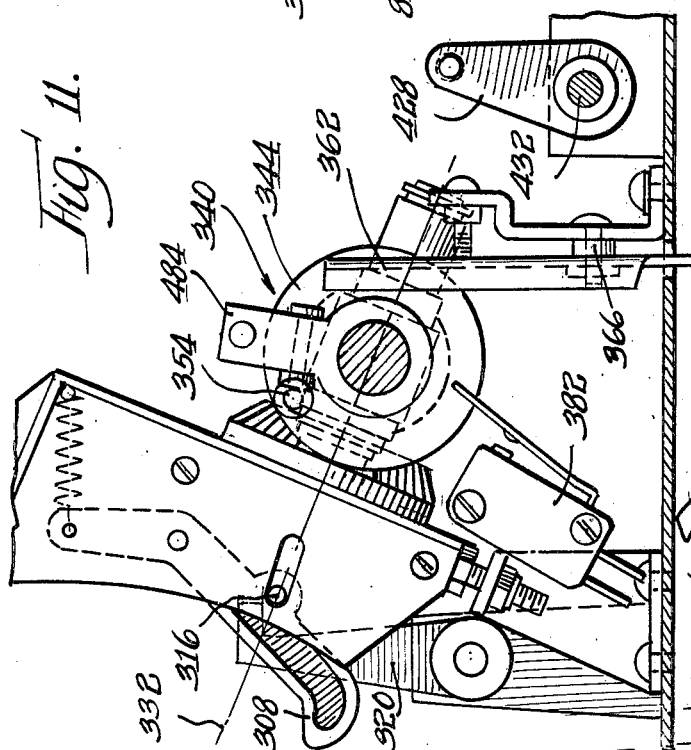

March 17, 1970  F. H. OSBORNE ET AL  3,501,153
CHANGER AND SELECTOR MECHANISM
Filed March 1, 1967  21 Sheets-Sheet 7
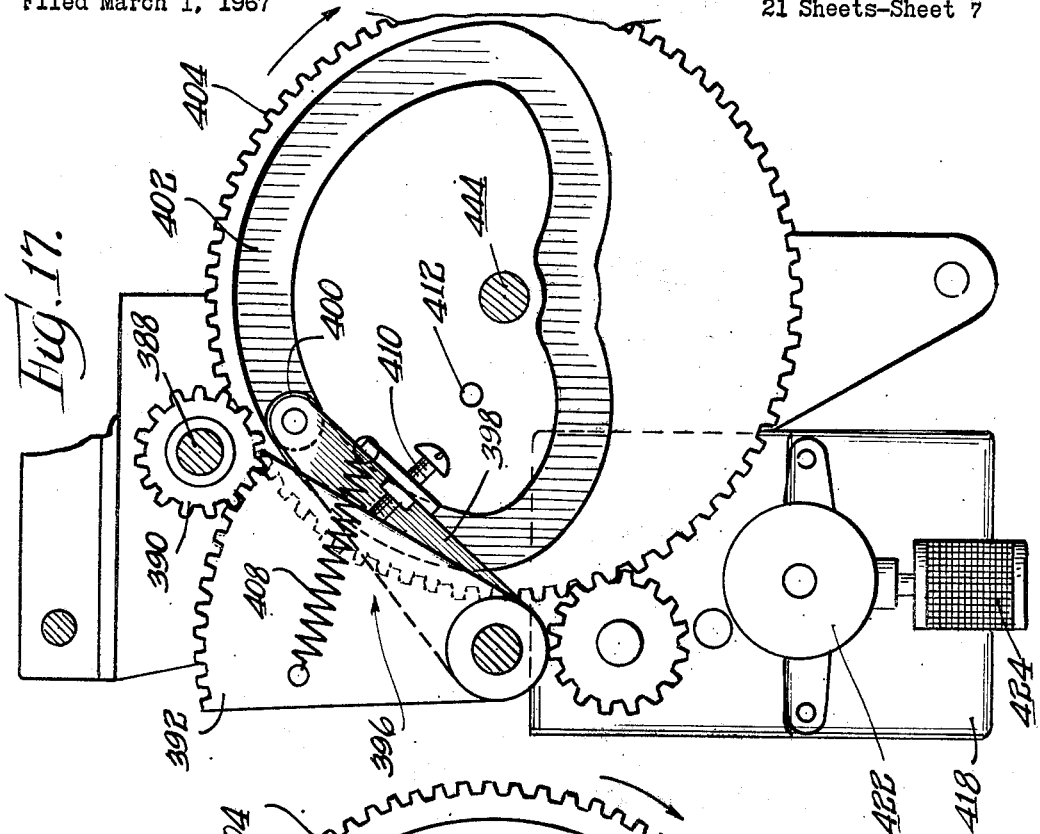
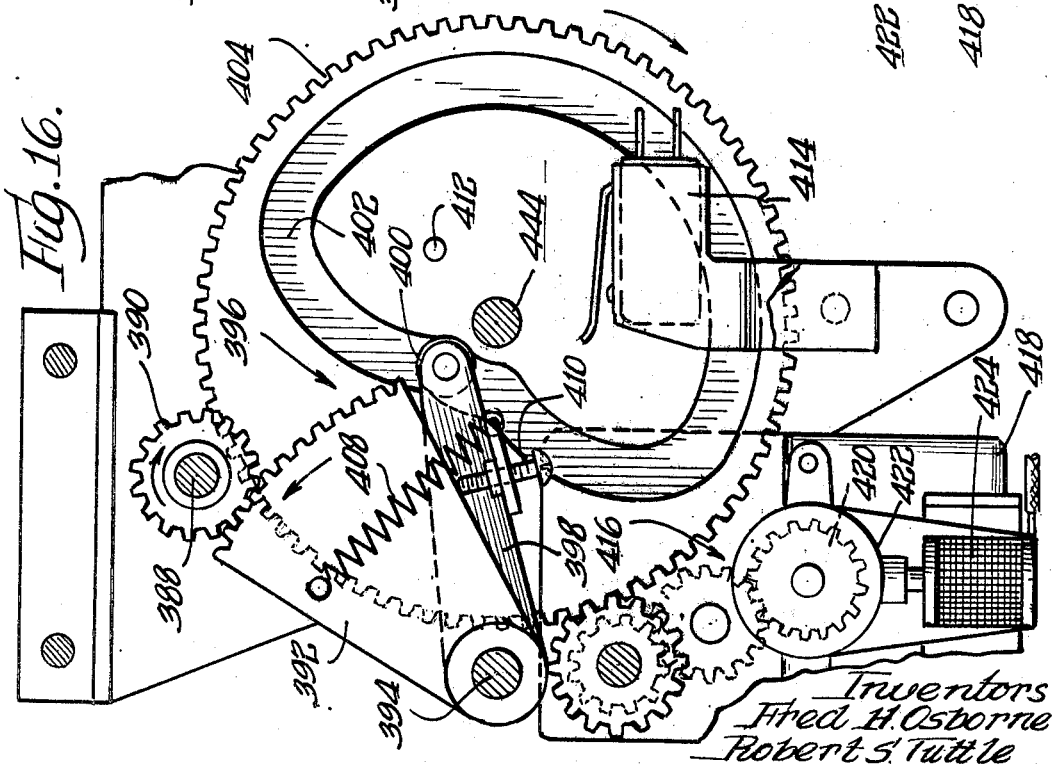
Inventors
Fred H. Osborne
Robert S. Tuttle
Michael J. Corbett
By: Olson, Trexler, Wolters & Bushnell attys.

March 17, 1970   F. H. OSBORNE ET AL   3,501,153
CHANGER AND SELECTOR MECHANISM

Filed March 1, 1967   21 Sheets-Sheet 8

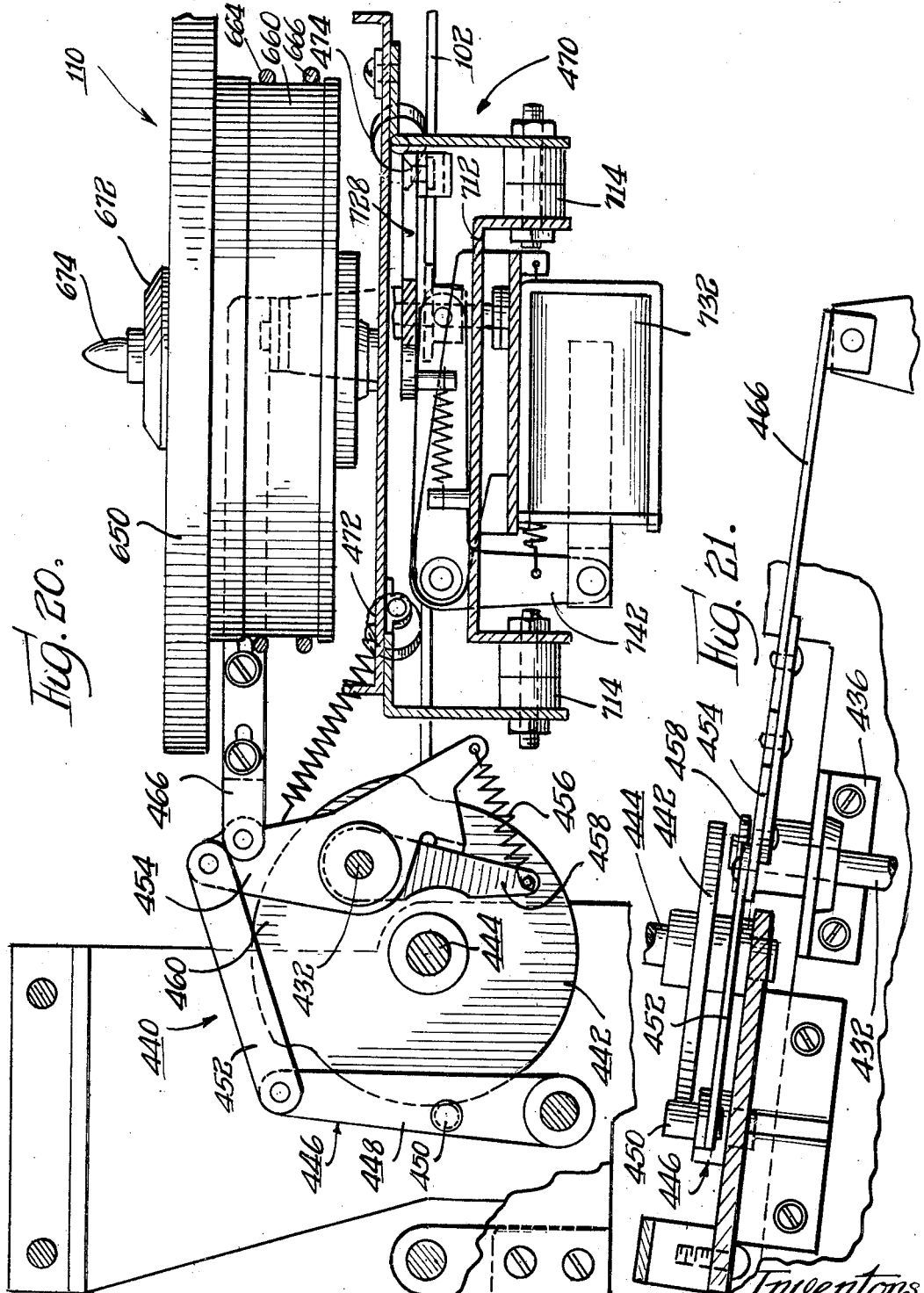

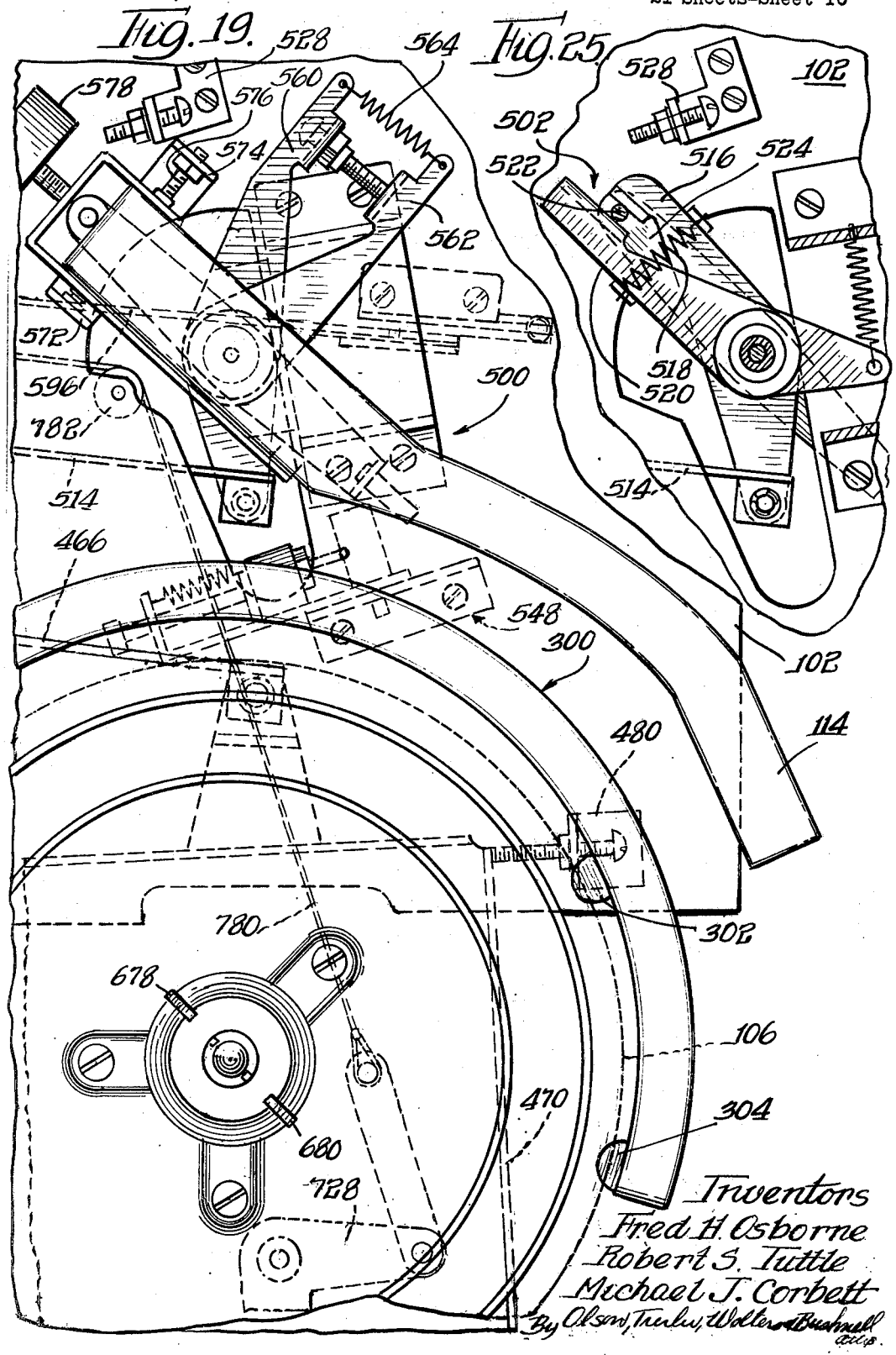

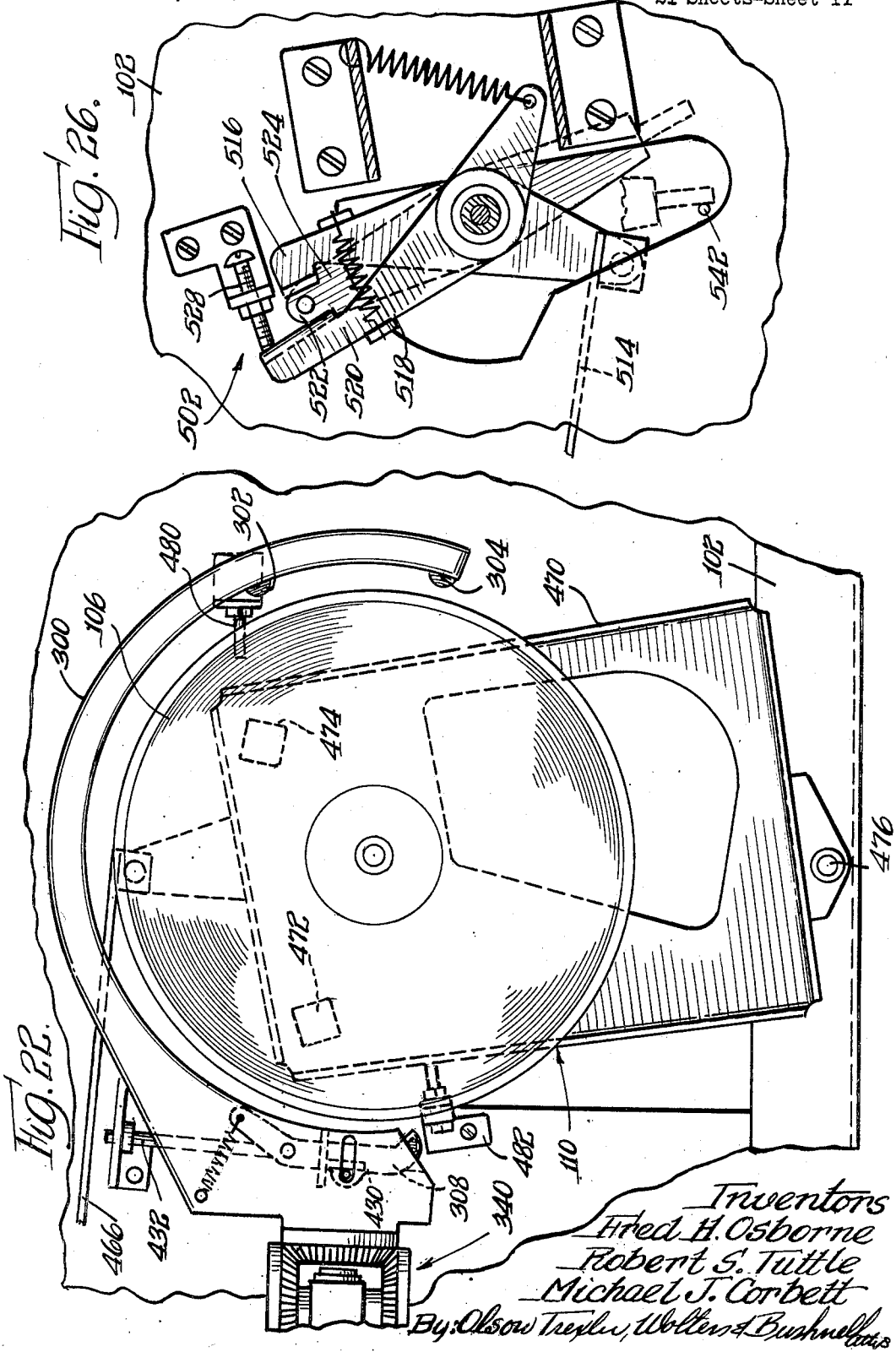

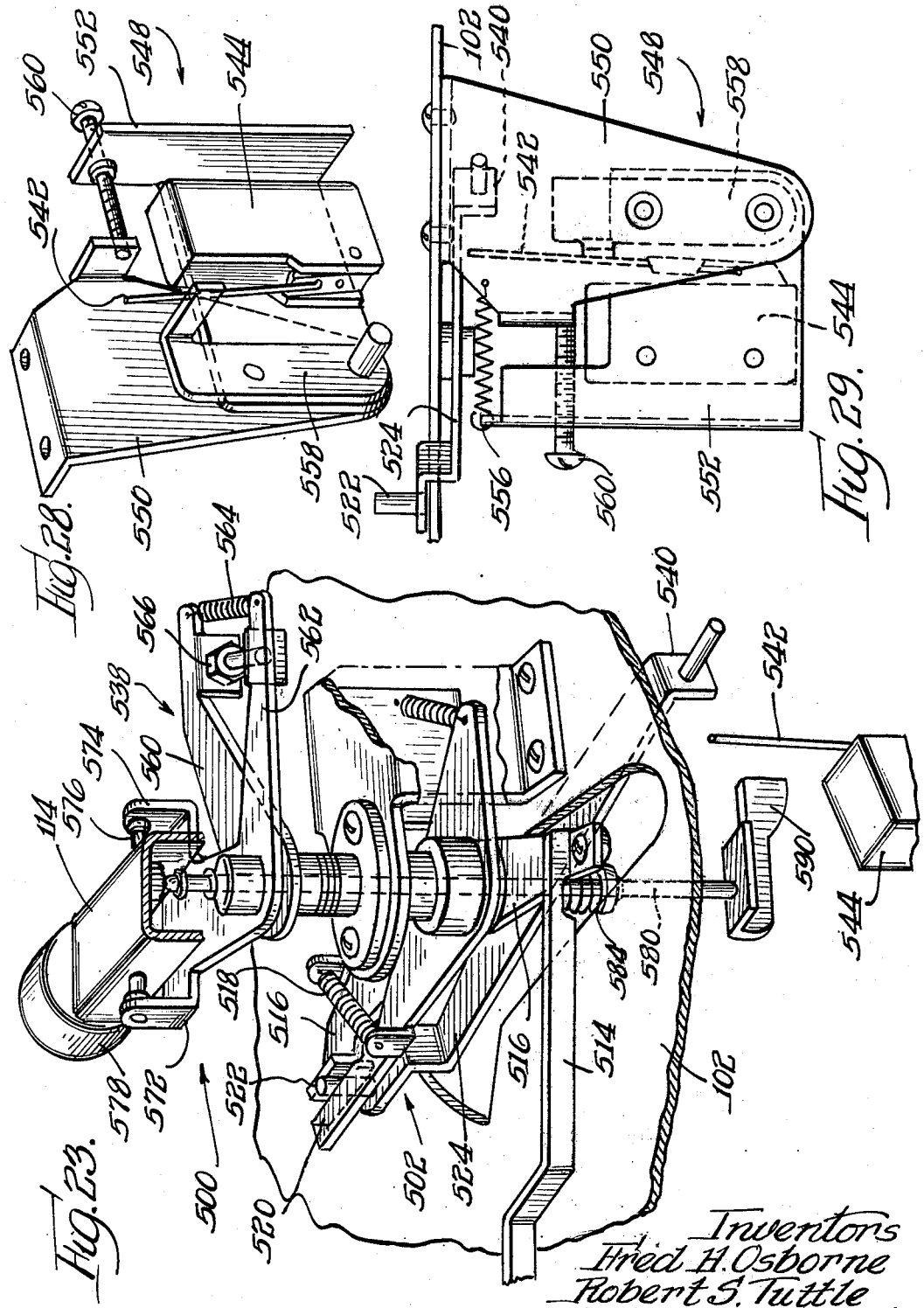

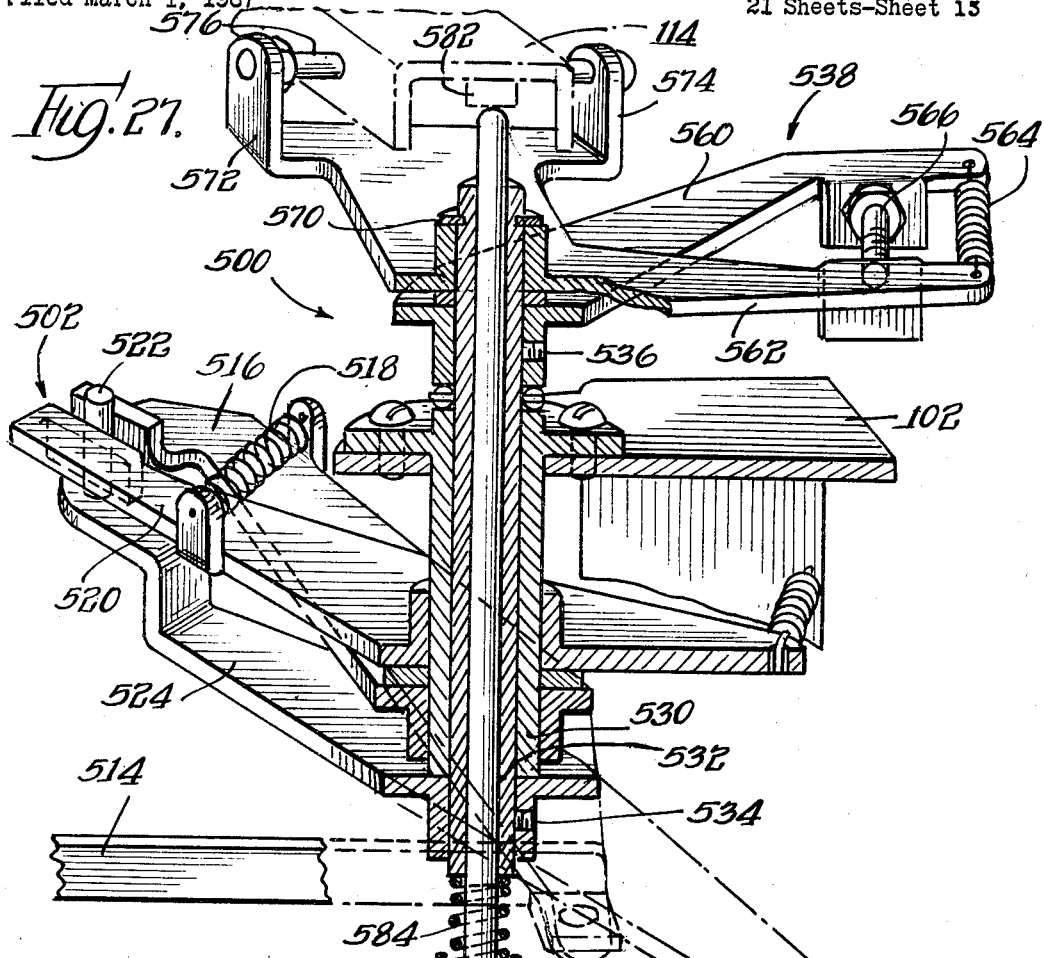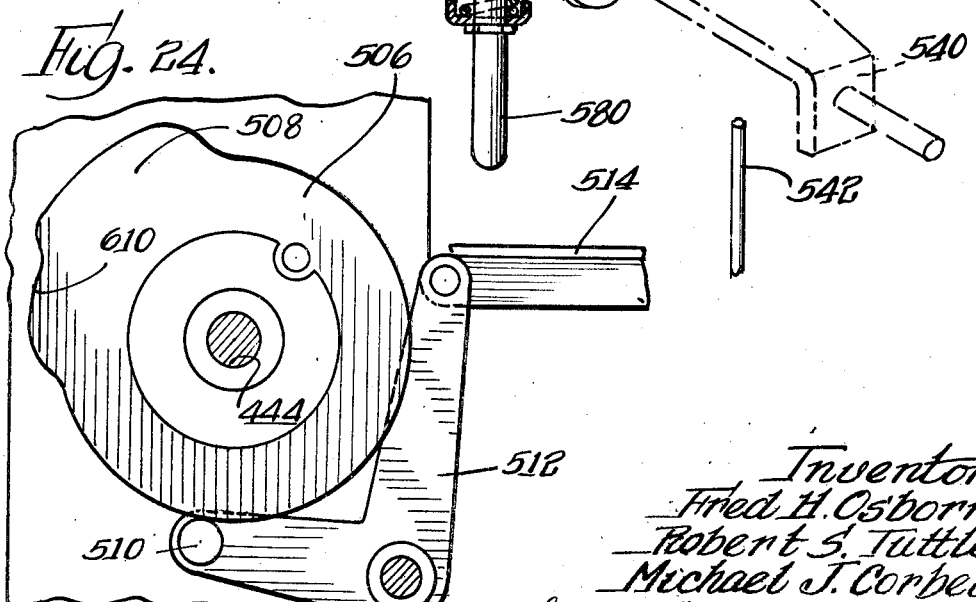

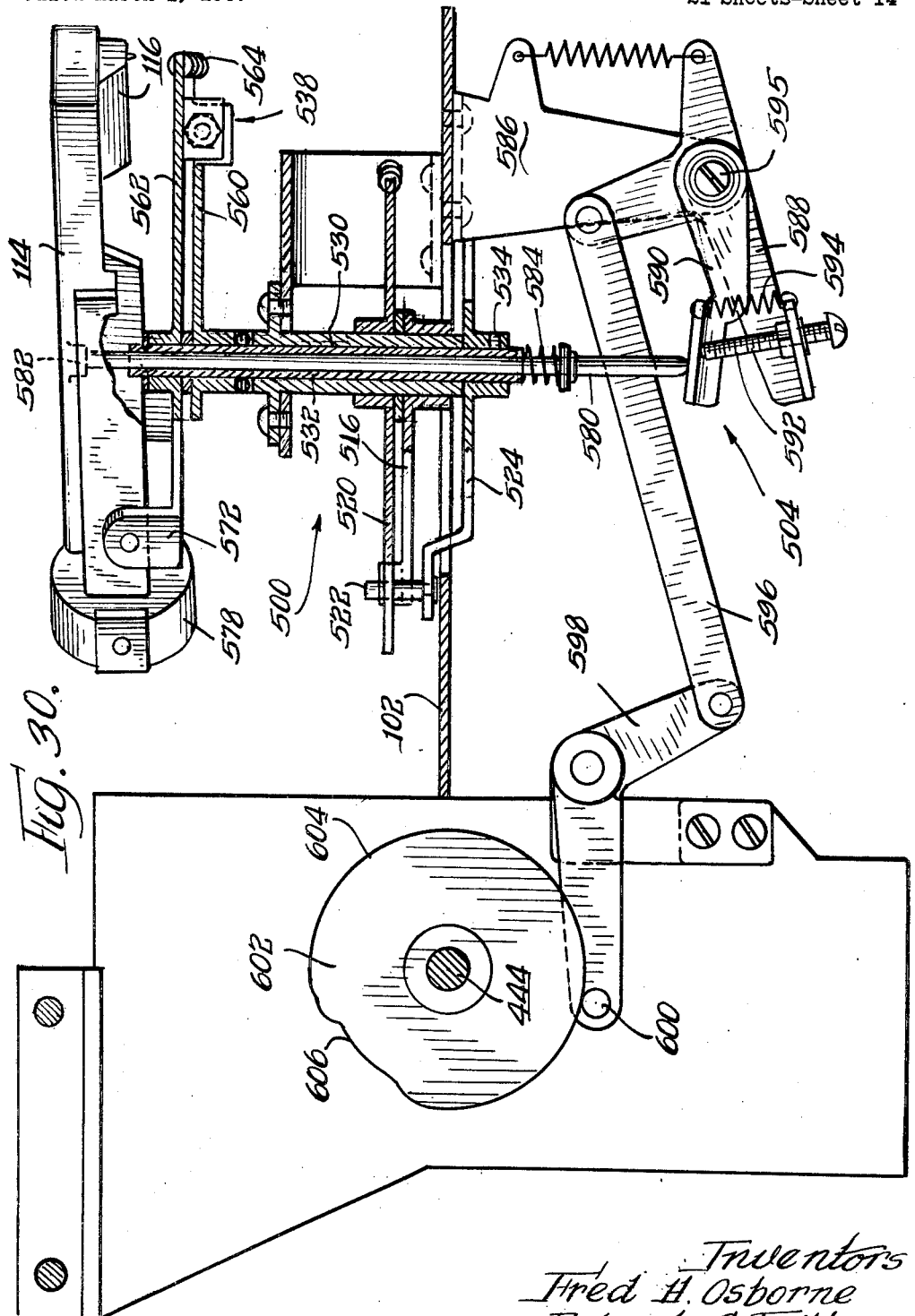

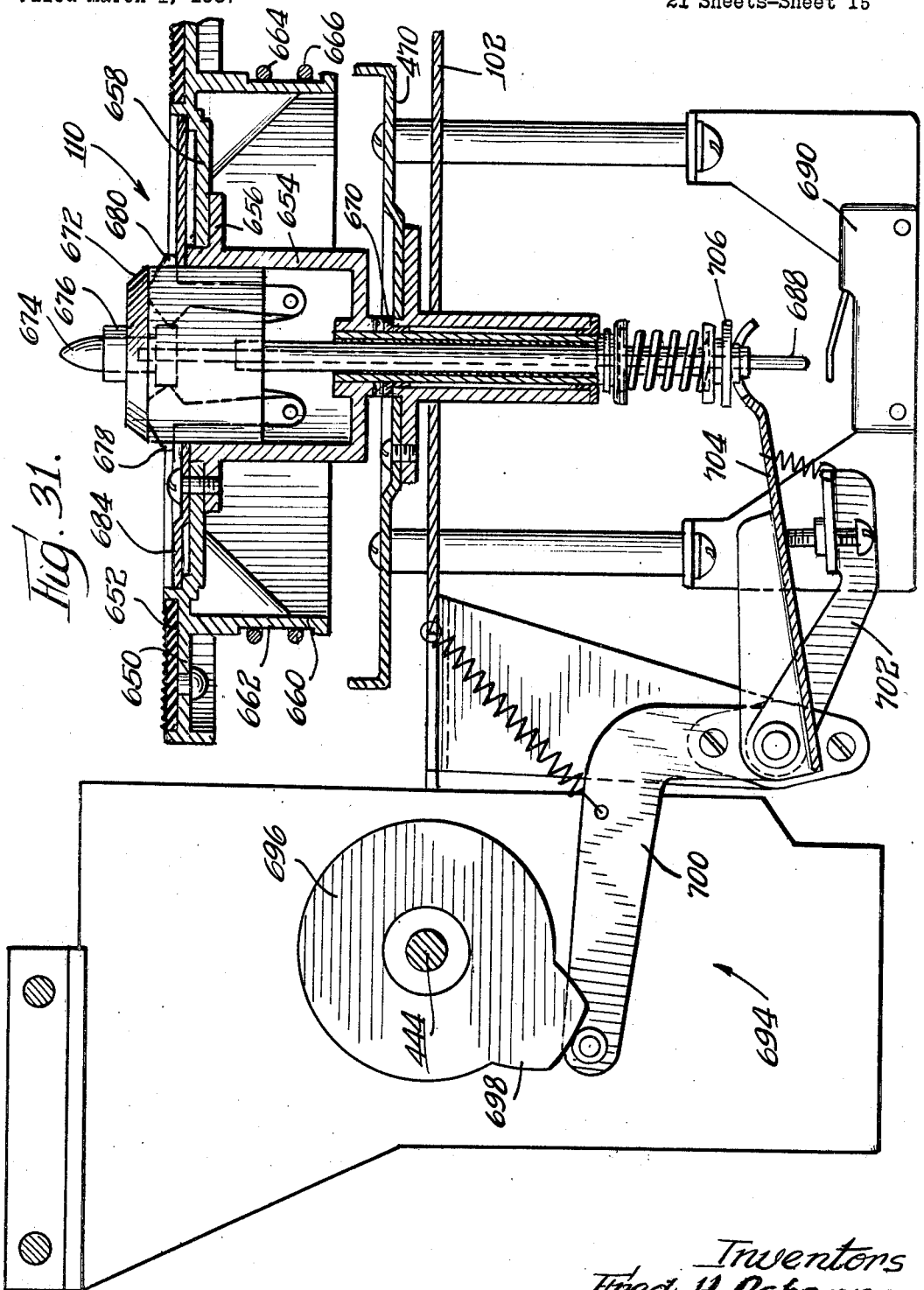

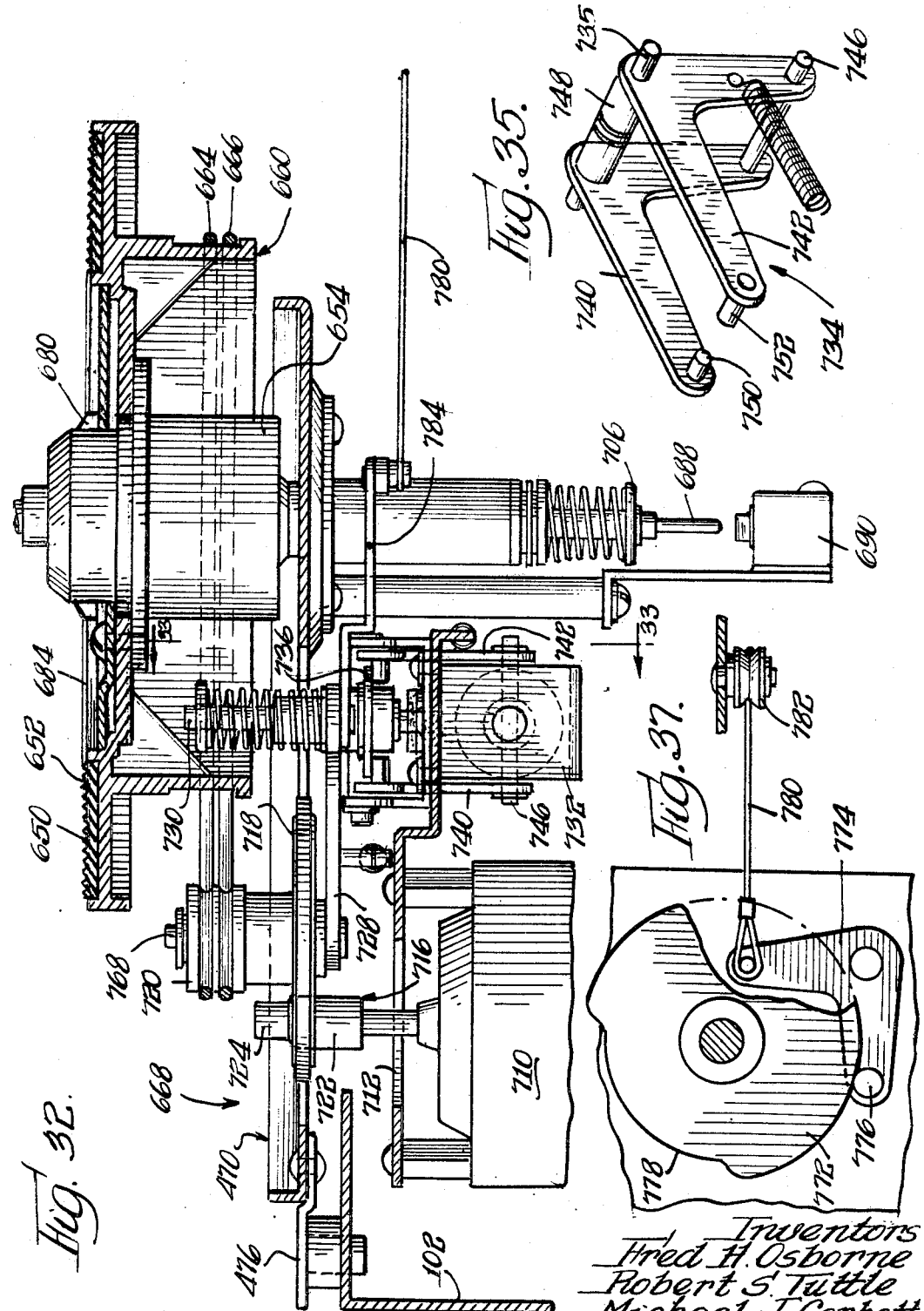

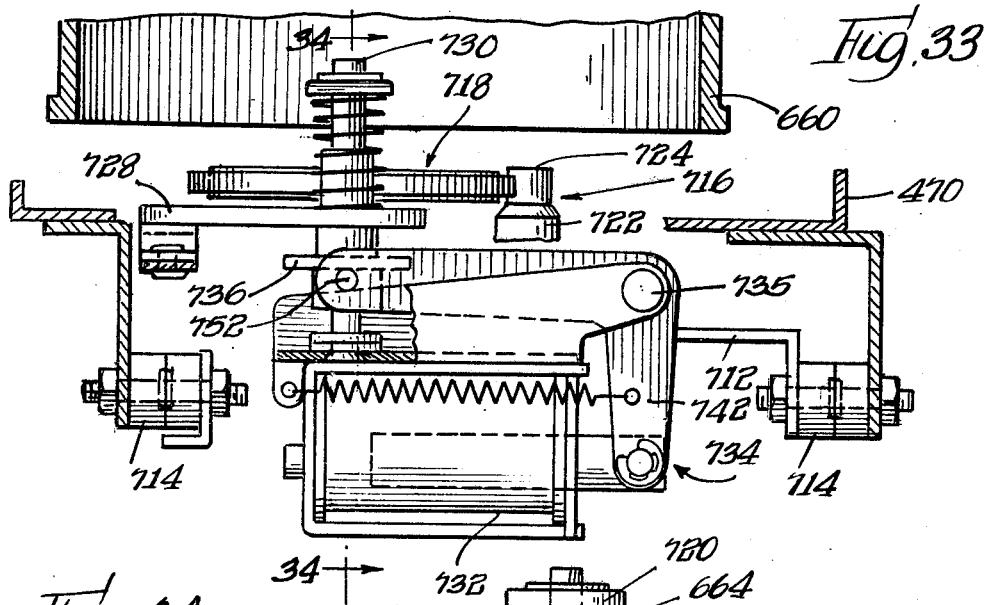
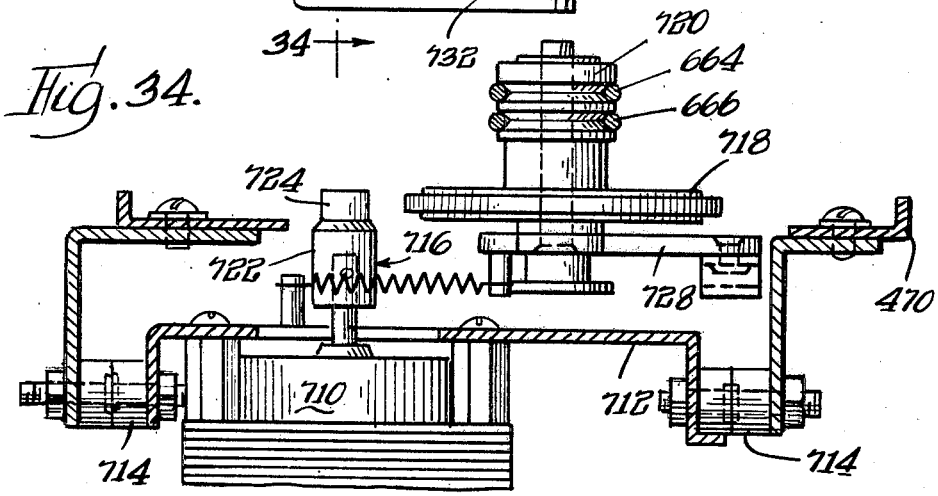
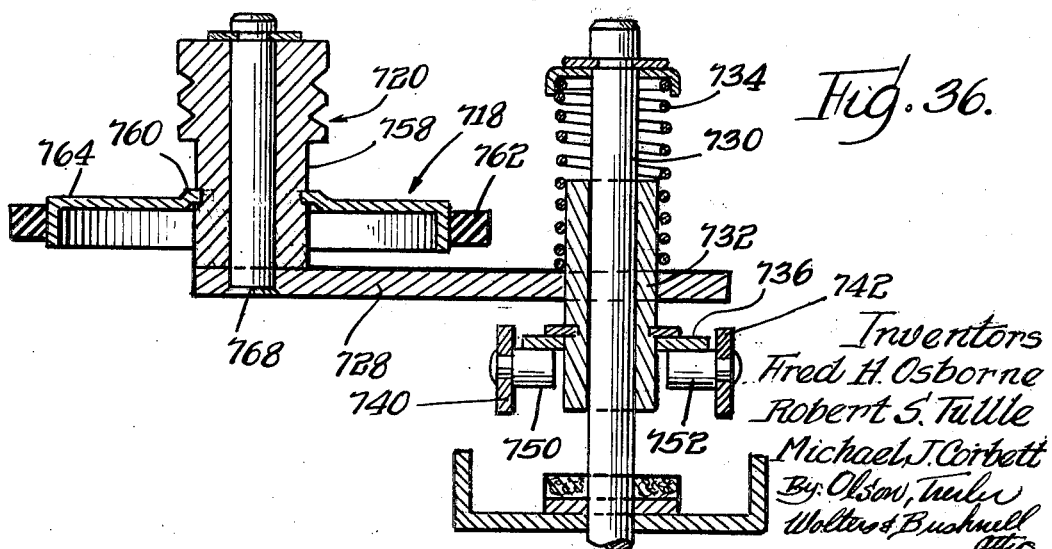

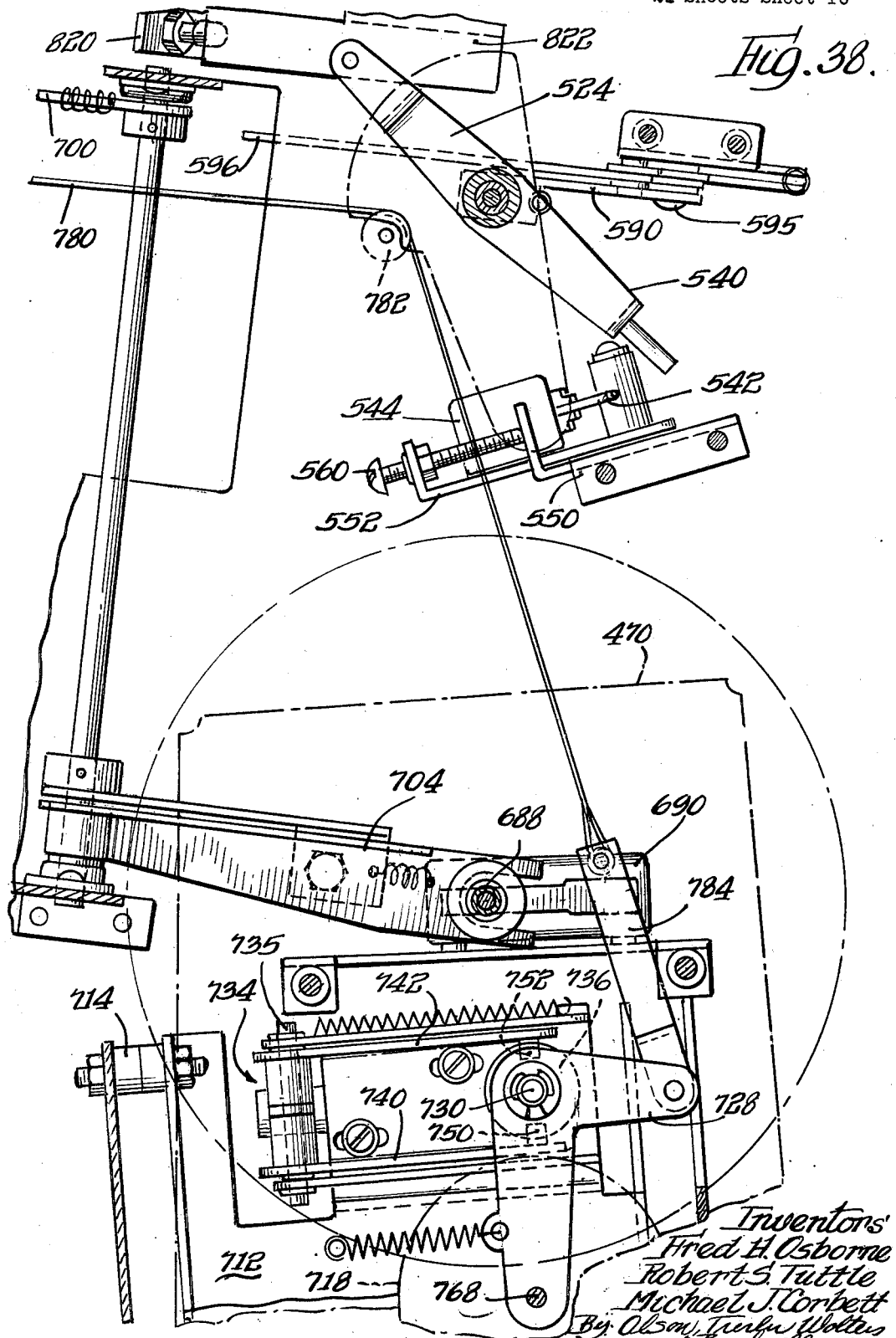

Inventors
Fred H. Osborne
Robert S. Tuttle
Michael J. Corbett
By Olson, Trexler, Wolters & Bushnell
attys

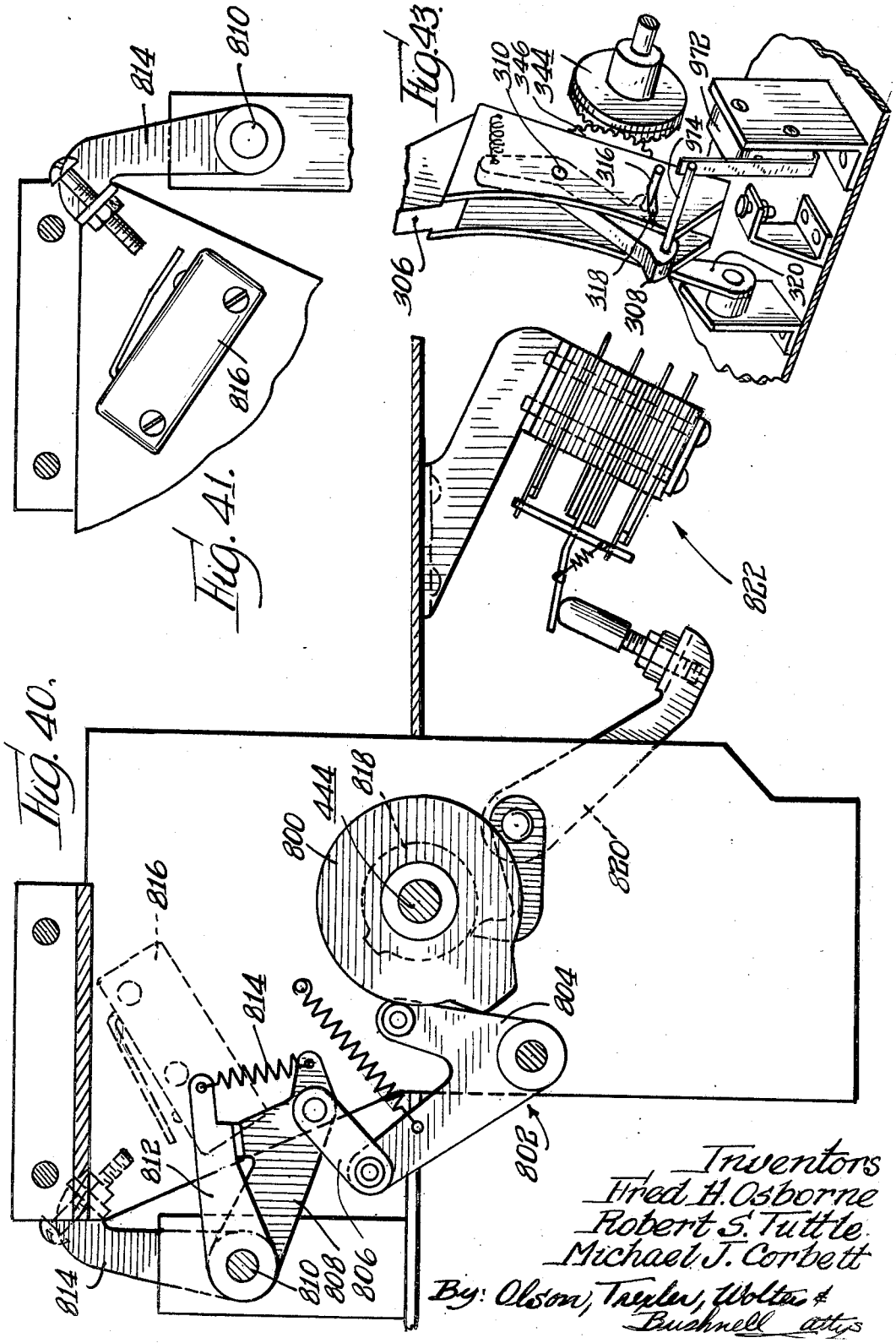

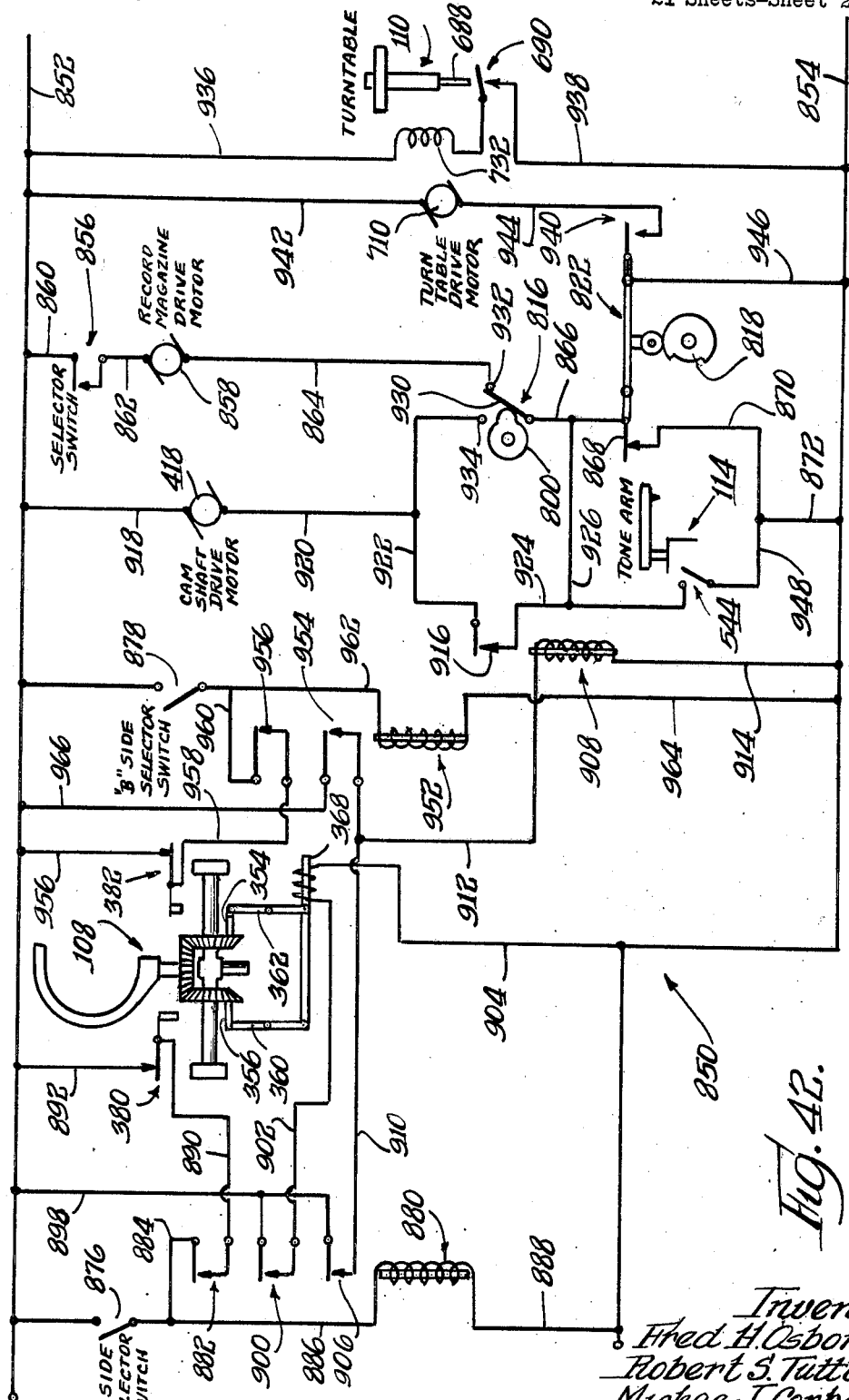

United States Patent Office 3,501,153
Patented Mar. 17, 1970

3,501,153
CHANGER AND SELECTOR MECHANISM
Fred H. Osborne, Williamsville, Robert S. Tuttle, Eggertsville, and Michael J. Corbett, North Tonawanda, N.Y., assignors to The Wurlitzer Company, Chicago, Ill., a corporation of Ohio
Filed Mar. 1, 1967, Ser. No. 619,687
Int. Cl. G11b 17/08, 17/22
U.S. Cl. 274—10          31 Claims

ABSTRACT OF THE DISCLOSURE

An automatic record changer assembly having a record storage magazine, a turntable and pickup arm, and a transfer mechanism all mounted on a common base. The record storage magazine is of a toroidal shape, and is rotatable about a vertical axis. The record storage magazine has a central conical surface, while the record transfer mechanism has a record clamp arm engageable with a record to roll it up the conical surface into engagement with record engaging members on the transfer mechanism. The transfer mechanism pivots away from the record storage magazine toward the turntable, and is provided with a differential gear set which flips the record transfer mechanism, and hence the record, with one face or the other of the record up on the turntable. The axis of the turntable likewise is vertical, and is shiftable laterally of the record storage magazine to disengage the record from the record engaging member of the record transfer mechanism. Operation is in the reverse upon termination of playing of a record to return the record to the storage magazine.

DISCLOSURE

Prior art automatic phonographs are commonly rather large in size and have a record magazine in which a plurality of phonograph records are stored. The records are usually removed from the record magazine by a record extractor assembly having a transfer arm for holding a selected record. By means of complex cams and Geneva movements, the extractor assembly of prior art automatic phonographs moves the selected record out of the record magazine and into position on the turntable of the phonograph. Once the selected record is positioned on the turntable, a second assembly of cams and Geneva movements is effective for releasing the record from the extractor assembly, and for moving a pickup or tone arm onto the record. After the record has been played, the various cams and Geneva movements are effective to disengage the tone arm from the record, reengage the record with the extractor assembly, and to return the record to the record magazine.

Serious problems have been encountered in the operation of the record extractor and tone arm positioning assemblies used in their prior art automatic phonographs. The cams and Geneva movements tend to wear severely during use. This wear results in sloppy or imprecise movements of both the record extractor assembly and the tone arm. The sloppy movement of the record extractor assembly results in records being broken as they are removed from and inserted into the record magazine. In addition, the worn record extractor assembly will often break a record by failing to obtain a secure grip on the record before removing a record from the record magazine. The sloppy movement of the tone arm results in the tone arm being positioned radially inwardly or outwardly of the beginning of a record. When the tone arm is imprecisely positioned, the entire record is not played, or the tone arm completely misses engaging the record.

It is one object of this invention to provide an improved record extractor drive assembly and tone arm positioning assembly for an automatic phonograph which overcomes the aforementioned problems encountered in the use of prior art automatic phonographs.

Specifically it is an object of this invention to provide a durable, wear-resistant record extractor and positioning assembly which, even after relatively long periods of use, will transfer a record from a record magazine to a turntable while rotating the record to position a selected side for playing. In addition, the record extractor and positioning assembly provided by this invention will return the record to the magazine after the record has been played.

Another specific object of this invention is to provide an improved tone arm positioning mechanism for positively positioning a phonograph tone or pickup arm relative to a record, the tone arm positioning mechanism being effective to enable the tone arm to move freely under the influence of a recording groove on the record once the tone arm has been initially positioned relative to the record.

It is also an object of this invention to provide a rugged, positively acting, control assembly for coordinating the movements of the record extractor assembly and the tone arm relative to the turntable of the phonograph.

Automatic phonographs are commonly found in restaurants and other commercial establishments. Since only limited space is available in most commercial establishments, the automatic phonograph should be as compact as possible. In addition to being compact, an automatic phonograph should be dimensioned to move easily through relatively small doors and into and around tight corners. This dimensioning is commonly obtained by positioning a generally toroidal record magazine with its central axis extending horizontally, while the record turntable is positioned adjacent a central portion of the record magazine with a central axis of the turntable extending vertically. Such an arrangement of components results in a relatively high and wide record player which is often difficult to position in a commercial establishment. In addition, the positioning of the toroidal record magazine with its central axis extending in a generally horizontal direction requires that a latch mechanism be provided for retaining the records in the record magazine. Such a latch mechanism impedes the removal of a record from the record magazine by a record extractor assembly. In fact, if the record latch mechanism should jam, it is almost impossible to remove a record from the record magazine.

One of our objectives in the present invention is to provide a novel and highly advantageous, compact relationship between the record magazine and turntable for an automatic phonograph. The compactness of the phonograph is increased by the position of a novel control arrangement. In addition to providing this compact relationship, we have provided an automatic phonograph having an easily accessible storage magazine which facilitates the transfer of records from the magazine to a turntable, and from the turntable to the magazine.

Additional features and objects of the invention pertain to the particular structure and arrangement whereby the above objects are attained. In order that the invention, both as to its structure and mode of operation, may be readily understood, reference should be made to the following detailed description taken in connection with the accompanying drawings wherein:

FIG. 1 is a perspective view of a phonograph record changer assembly forming a preferred embodiment of the invention;

FIG. 2 is an enlarged fragmentary perspective view of the record changer assembly of FIG. 1 with a record transfer assembly positioned to place a record on a phonograph turntable;

FIG. 3 is an enlarged fragmentary plan view of a record magazine and the record transfer assembly of the record changer assembly of FIG. 1;

FIG. 4 is an enlarged fragmentary elevational view illustrating schematically the operation of the record transfer assembly used with the record selector assembly of FIG. 1;

FIG. 5 is an enlarged fragmentary perspective view of a portion of a partition used with the record magazine of FIG. 3 to define a filing location for a record;

FIG. 6 is an enlarged plan view of the record magazine indexing and latching mechanism used with the record magazine of FIG. 3;

FIG. 9 is an enlarged sectional view illustrating the relationship of the differential gearing assembly for the record transfer assembly of FIGS. 2 and 7 to a control mechanism for controlling the operation of the record changer assembly of FIG. 1;

FIG. 10 is an enlarged plan view, taken along the line 10—10 of FIG. 9, further illustrating the construction of the differential gearing assembly used with the record transfer assembly of FIGS. 2 and 7;

FIG. 11 is a sectional view taken along the line 11—11 of FIG. 9, illustrating the relationship of the differential gearing assembly to a stop member and a limit switch used in conjunction with the record transfer assembly;

FIG. 12 is a fragmentary sectional view, similar to FIG. 11, illustrating the positioning of a gear of the differential gearing assembly relative to a stop member when the record transfer assembly is in the initial position, before the transfer of a selected record has started, shown in FIG. 1;

FIG. 13 is a fragmentary sectional view, similar to FIG. 12, illustrating the relationship of the differential gear assembly to a stop member when the stop member has been engaged by a pin projecting outwardly from a gear of the differential gear assembly during the transfer of the selected record from the record magazine to the turntable;

FIG. 14 is a fragmentary sectional view illustrating the position of the differential gear assembly when the selected record has been placed on the turntable of the record changer assembly;

FIG. 15 is a sectional view illustrating the relationship of a second pin on an opposite gear of the differential gear assembly relative to a limit switch and a second stop member when the record has been placed on the turntable of the record changer assembly;

FIG. 16 is an enlarged elevational view of a drive assembly shown in an initial or starting position, for the record transfer assembly;

FIG. 17 is an enlarged sectional view, similar to FIG. 16, illustrating the positioning of the record transfer drive assembly after a selected record has been positioned on the turntable;

FIGS. 18 and 19 are an enlarged plan view of the record transfer assembly, the turntable, a control mechanism for the record selector assembly, and a tone arm for the record selector assembly, FIG. 19 being an extension of FIG. 18;

FIG. 20 is an enlarged elevational view illustrating the relationship of the turntable to a drive mechanism for moving the turntable and disengaging a selected record positioned on the turntable from the record transfer assembly;

FIG. 21 is a plan view of the linkage used in FIG. 20 for moving the turntable relative to the record transfer assembly;

FIG. 22 is a plan view, somewhat similar to FIGS. 18 and 19 but on a reduced scale, illustrating the relationship of a record on the turntable relative to the record transfer assembly when the turntable has been moved and the record disengaged from the record transfer assembly by the drive mechanism of FIG. 20;

FIG. 23 is an enlarged fragmentary perspective view of the tone arm and tone arm drive assembly used with the record changer assembly of FIG. 1;

FIG. 24 is an enlarged elevational view of a control linkage which is connected to the tone arm drive assembly of FIG. 23 for swinging the tone arm in a generally horizontal direction relative to the turntable;

FIG. 25 (on sheet 9 of the drawings) is a plan view of the tone arm drive assembly of FIG. 23 illustrating the drive assembly in an initial position with the tone arm positioned as shown in FIG. 1;

FIG. 26 (on sheet 11 of the drawings) is a plan view, similar to FIG. 25, illustrating the drive mechanism of FIG. 25 when the tone arm is in engagement with a record on the turntable and is free to move relative to the turntable;

FIG. 27 (on sheet 13 of the drawings) is an enlarged partial sectional perspective view illustrating in detail the construction of the tone arm and tone arm drive assembly;

FIG. 28 (on sheet 12 of the drawings) is an enlarged perspective view of a sensing switch assembly used with the tone arm drive assembly of FIG. 23 for sensing the end of a record being played on the turntable;

FIG. 29 is an enlarged elevational view of the sensing switch of FIG. 28 illustrating the relationship of a tone arm positioning lever of the tone arm drive assembly relative to the sensing switch some time before the end of a record being played on the turntable;

FIG. 30 is an enlarged elevational view illustrating a drive assembly for moving the tone arm vertically into and out of engagement with a record on the turntable;

FIG. 31 is an enlarged sectional view illustrating in detail the structure of a preferred embodiment of the turntable in position for playing a 45 r.p.m. record and a resetting cam for moving the turntable to the position shown after a 33⅓ r.p.m. record has been played;

FIG. 32 is an enlarged elevational view of a two speed turntable drive mechanism for the turntable of FIG. 31 with the drive mechanism positioned to rotate the turntable at 45 r.p.m.;

FIG. 33 is a modified elevational view along the line 33—33 of FIG. 32 further illustrating the turntable drive mechanism of FIG. 32 positioned to rotate the turntable at 33⅓ r.p.m.;

FIG. 34 is an elevational view, along the line 34—34 of FIG. 33, illustrating the relationship of a drive wheel for the turntable relative to a drive shaft of a turntable drive motor when the drive wheel has been moved out of driving engagement with the drive shaft;

FIG. 35 is an enlarged perspective view of a control assembly for moving the drive wheel of FIG. 35 relative to the drive shaft to change the rate of rotation of the turntable;

FIG. 36 is an enlarged sectional view illustrating the construction and mounting of the drive wheel utilized in a turntable drive mechanism;

FIG. 37 (on sheet 16 of the drawings) is an enlarged elevational view of a central linkage used with the turntable drive mechanism of FIG. 32 to move the drive wheel relative to the drive shaft from a position engaging the drive shaft to a position spaced apart from the drive shaft as shown in FIG. 34;

FIG. 38 is an enlarged plan view illustrating a linkage for connecting the control linkage of FIG. 37 to the turntable drive assembly of FIG. 32;

FIG. 40 is an enlarged elevational view illustrating a control structure for releasing the record transfer assembly, actuating an end of cycle switch, and for actuating a control switch;

FIG. 41 is an elevational view of the end of cycle switch shown in FIG. 40;

FIG. 42 is a schematic illustration of a control circuitry used with the record changer assembly of FIG. 1; and FIG. 43 is an enlarged perspective view illustrating a control switch used with a modified form of the invention.

Figure 7:
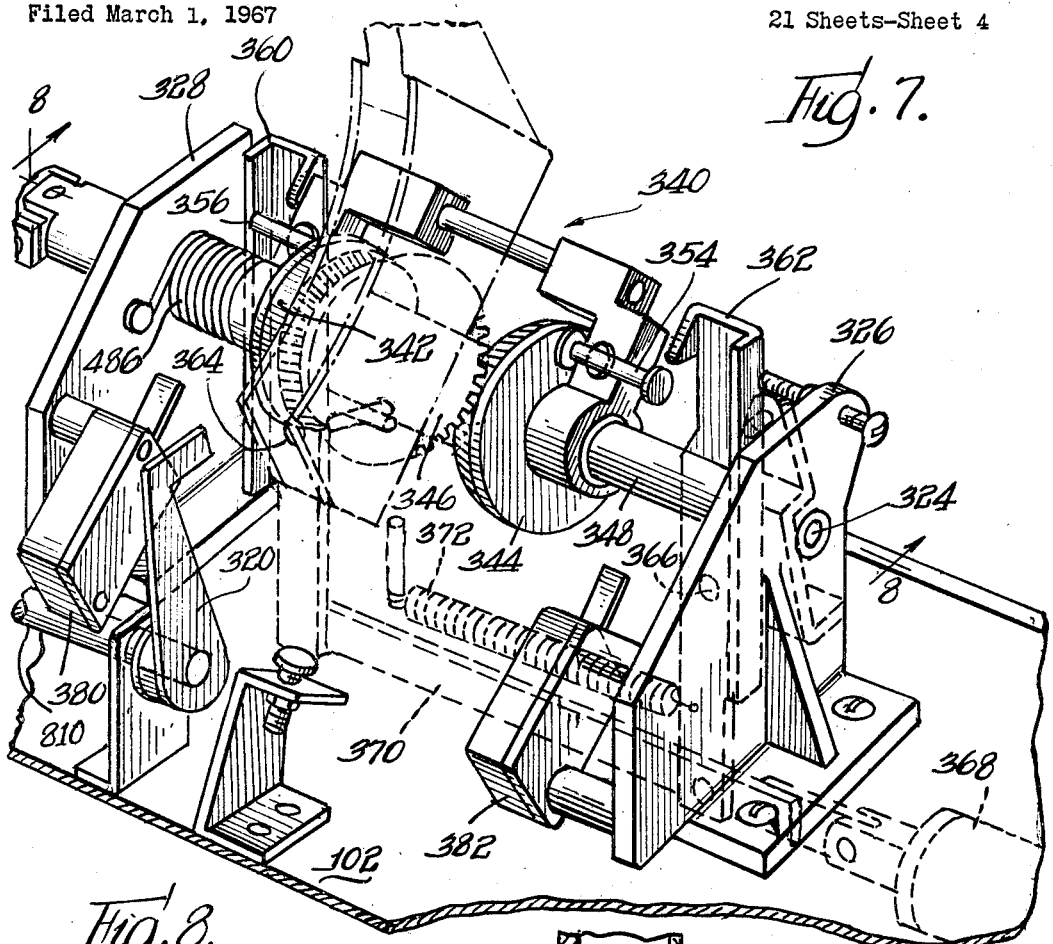
FIG. 7 is an enlarged fragmentary perspective view of a differential gearing assembly used with the record transfer assembly of FIG. 2.

Referring now to the drawings in greater detail, a record changer or selector assembly 100 is shown in FIGS. 1 and 2. The record changer assembly 100 is intended for mounting on a base or support frame 102 for use in an automatic phonograph of the type commonly found in commercial establishments. The record changer assembly 100 includes a record magazine or basket 104 for holding a plurality of records 106 in a generally toroidal relationship relative to the support frame 102. The records 106 are moved from the record magazine 104 by a record transfer or positioning assembly or mechanism 108. The record transfer mechanism 108 engages a selected record 106 in the record magazine 104 and transfers the record from the record magazine 104 to a turntable 110 which is also mounted on the support frame 102. The movements of the record transfer mechanism 108 relative to the turntable 110 are controlled by a main drive and control mechanism 112 which is mounted on the base 102 adjacent to the record transfer assembly and intermediate the turntable 110 and record magazine 104. A tone or pickup arm 114 is provided for engaging a groove in a record with a needle asembly 116 to play the record which is rotated relative to the tone arm 114 by a turntable drive assembly 118.

From an inspection of FIG. 1 it is apparent that the record magazine 104 has a generally circular shape with a central axis 122 of the record magazine 104 extending in a substantially parallel relationship with a central axis 124 of the turntable 110. This substantially parallel relationship of the axes 122 and 124 facilitates the storage of a plurality of records 106 in a comparatively small space of the base 102 while providing a suitable mounting on the base for the turntable 110. To transfer a record from the storage magazine 104 to the turntable 110, it is merely necessary for the record transfer assembly 108 to engage a selected record in the record magazine 104 and extract or remove the record from the record magazine and then turn the record so that a selected side is positioned upwardly for playing by engagement with the needle 116 of the tone arm 114. It will be apparent to those skilled in the art that the positioning of the record magazine 104, with its central axis 122 extending in a parallel relationship with the central axis 124 of the turntable 110, provides a substantially rectangular record changer assembly 100 which can be readily mounted in a suitable cabinet. Due to the arrangement of the record magazine 104, the record transfer assembly 108, the turntable 110, the control mechanism 112, and the tone arm 114, the record changer assembly 100 is compact with relatively small vertical and longitudinal dimensions. The compactness of the record changer assembly enables a record cabinet in which the record changer assembly 100 is mounted to be readily positioned in almost any desired location. It will also be apparent to those skilled in the art that the entire record changer assembly 100 can be readily removed from a cabinet on the base 102 and replaced by a similar structure if, due to a malfunction of the record changer assembly 100, it should be desired to replace the existing record changer assembly.

RECORD MAGAZINE

The structure of the record magazine 104 is set forth in greater detail in FIGS. 3 through 6 which are to be considered in conjunction with FIG. 1. The record magazine 104 has a generally circular base plate 200 (see FIG. 3) upon which a plurality of radially outwardly extending partitions or panels 202 are mounted in a generally toroidal arrangement. The partitions 202 provide a series of radially extending record filing or storage locations or slots 204 intermediate opposed face surfaces of the partitions or panels 202. The records 106 are retained in the filing locations 204 with their planar surfaces in a substantially upright orientation in juxtaposition with the partitions 102 to enable the record transfer mechanism 108 to readily engage a selected record, as shown in FIG. 4, to move the record from its predetermined storage location to a playing position on the turntable 110.

The records 106 are retained in a generally toroidal relationship in their storage locations 204 by engagement of an outer edge or rim of the record with a radially inwardly and axially outwardly sloping circular central surface 208 which is formed on a circular center support member 210. The support member 210 is mounted on the base plate 200 by a plurality of screws, or other connection means which are not shown. As indicated by dashed lines in FIG. 4, the radially outer edge of a filed or stored record 106 also engages a support section 214, which is integrally formed with the partition or panel 202. The central surface 208 and support section 214 form a pair of opposed supporting means for retaining the record against rolling out of the record storage magazine 104.

The partitions 202, as is perhaps best seen in FIG. 3, are formed with a plurality of axially inwardly and circumferentially outwardly sloping cam surfaces 218 which are positioned on radially and axially outermost edge portions of the partitions 202 (see FIG. 4). The cam surfaces 218 engage the outer edge or rim of a record 106 as the record is being slid or moved into its predetermined filing location intermediate the partitions 202 to position the record relative to the partitions. Thus, if the record magazine 104 should be positioned a slight arcuate distance offset from the record transfer assembly 108 as the record transfer assembly is returning a record to its predetermined filing location 204, the record is engaged by a cam surface 218 associated with the filing location and turned or directed into the filing location. The partitions 202 are made up of a stiff but resilient elastomeric material and are resiliently bent circumferentially as the record engages the cam 218 to enable the record to be inserted into its filing location without damaging the record.

As the record is being inserted into its filing location, a plurality of outwardly extending ribs 222, which are integrally formed with the partitions 202, engage the planar side surfaces of the record to guide the record downwardly into engagement with the support section 214 of the partition and the central surface 208 of the center mounting piece 210. As is perhaps best seen in FIG. 4, the ribs 222 includes a pair of acute angled radially and axially inwardly extending ribs 224 which radiate from the cam surface 218. An outer rib or lip 226 is formed on an axially outer side of the partition as an integral extension of the cam 218 to guide the record inwardly into engagement with the support surface 208 and support section 214. In addition to these ribs, an axially outwardly extending substantially upright rib 228 is formed on the side of the partition 202 to further guide the record on its inward movement relative to the partition. The ribs 224, 226 and 228 are interconnected by a central panel 230 of the partition 202. From an inspection of FIG. 3 it will be apparent that the upper rib 226 is generally wedge shaped and is flared circumferentially outwardly as the rib extends radially away from the center of the record magazine 104. The central panel 230 has a substantially constant thickness. Therefore, the ribs 224 and 226 extend for an increasing distance outwardly from the panel 230, in a wedge shaped configuration, as they extend radially outwardly away from the center of the record magazine 104. Therefore, the outermost record engaging surfaces of the ribs 224, 226, and 228 define a substantially flat plane which is engaged by a record to hold the record upright when it is inserted in its predetermined filing location 204.

Referring now to FIG. 5, the support section 214 is formed by a radially and axially outwardly projecting wall or side 234 which is formed integrally with the panel 230. The radially outer edges of the panel 230 and the axially outer edge of the panel 234 are defined by circumferentially extending lips or ribs 236 and 238 which extend continuously from the cam surface 218. The outermost edges of the ribs 236 and 238 are positioned in a coplanar relationship with the outermost edges of the ribs 224, 226 and 228 to support the records 106 in their filing locations. A circumferentially outwardly extending protuberance or support wall 240 is connected to both a radially outer end of the rib 238 and a radially outer edge of the panel 234 to form an edge 242 which is engaged by a record when the record is in its filing location 204 (see FIG. 4).

The partitions 202 are retained in place on the mounting plate 200 by a plurality of screws 248 (see FIG. 4) which extend axially upwardly through a plurality of holes 250 (see FIG. 3) formed in the base plate 200. In addition, each of the partitions 202 includes a radially inwardly extending foot or protuberance 252 (see FIG. 5) which is engaged by the center mounting piece 210 (see FIG. 4) to retain the foot 252 in a predetermined relationship relative to the center mounting piece 210. The foot 252 includes an arcuate locking indentation or recess 254 which is engaged by a circular locking ring 256 having a circular radial cross-section and positioned under a radially outwardly extending rim 258 of the center piece 210. The rim 258 of the center piece 210 presses the locking ring 256 downwardly into the recess 254 to securely retain the foot 252 in a prdetermined position under the center piece 210. A tongue 262 extends axially downwardly from the foot 252 and engages an aperture 264 in the base plate 200 to further lock the partition 202 in position relative to the base plate 200. Thus by means of a plurality of screws 248, which extend through a first series of apertures 250 in the base plate 200, and a tongue 263, which extends through a second series of apertures 264 in the base plate 200, the partition 202 is prevented from moving circumferentially relative to the base plate 200. The screws 248 and the flange 258, which engages a locking ring 256 and the foot 252, prevent the partition 202 from moving axially relative to the base 200.

It will be apparent to those skilled in the art that the above described method of mounting the partitions 202 greatly facilitates the assembly of the record magazine 104. The record magazine 104 is assembled by first positioning a partition 202 on the base plate 200 with the tongue 262 extending into an aperture 264. The partition is then positioned in alignment with an associated hole 250 and is secured to the base plate 200 by a screw 248. The partitions are then securely clamped in placed by attaching the center piece 210 to the base plate 200 with the locking ring 256 extending in a generally circular path through the recesses 254 formed in the feed 252 of the partitions 202. The use of the locking ring 256 eliminates any possible axial movement of the partitions 202 without requiring the use of additional screws for mounting the partitions.

The record magazine 104 is rotated relative to the base structure 102 by a ring gear 270 (see FIG. 4) which is mounted beneath the base section 200. The ring gear 270 is engaged by a record magazine drive motor (not shown) to rotate the record magazine until a predetermined record is adjacent to the record transfer assembly 108. When a predetermined record is adjacent to the record transfer assembly 108, a latch or index pawl or pin 272 (see FIG. 6) engages an index recess or notch 274 which is associated with the selected record. Since the latch pawl is offset relative to the record transfer assembly 108, the notch associated with a particular record filing location 204 is circumferentially offset relative to the associated filing location. The degree of offset of the latch pawl 272 relative to the record transfer assembly 108 is immaterial as long as the notches 274 are offset the same arcuate distance relative to their associated filing locations.

The record magazine 104 is indexed by an accumulator or selector unit to position a selected record 106 adjacent to the record transfer assembly 108 in a pickup or loading position, indicated at 276 in FIG. 3, where the record can be engaged by the record transfer assembly 108. It is contemplated that an accumulator or selector unit such as that set forth in an application filed in the names of Frank B. Lumney and Ronald P. Eberhardt, Ser. No. 619,686, for "Electromechanical Selector Unit" will be mounted beneath the base plate 200 and connected to the central axis 122 of the record magazine 104. While the accumulator structure set forth in the aforementioned application has been found to be particularly advantageous when used with the record changer assembly 100, it will be apparent to those skilled in the art that the selector units set forth in United States Patents No. 2,949,309 and No. 3,050,309 can also be used. The important consideration is that a selector or indexing mechanism be provided to position the selected record adjacent to the record transfer assembly in the loading position 276.

Once the record magazine 104 has been indexed to locate the selected record in the loading position 276 adjacent to the record transfer assembly 108, a solenoid 278 (see FIG. 6) is released to enable the latch pawl 272, which is mounted on a pivot bar 280, to swing into the notch 274. The notch 274, as is perhaps best seen in FIG. 3, includes a radially innermost end portion 282 which is arcuately shaped to receive the latch pawl 272 to securely and accurately retain the record magazine 104 with the selected record adjacent to the record transfer assembly 108. It should be noted that if the record magazine 104 should be stopped intermediate two filing locations, a radially inwardly sloping cam surface 284 is engaged by the latch pawl 272 to cam the record magazine 104 into position. When the record magazine 104 has been positioned by engagement of the pawl 272 in an index notch 274, a selected record is located in the loading position 276 adjacent to the record transfer assembly for engagement by the record transfer assembly 108 and positioning on the turntable 110 in a manner to be explained in greater detail subsequently.

Referring now to FIG. 4, when the record transfer assembly 108 engages a selected record 106, the record is rolled axially outwardly and radially inwardly from the position shown in dash lines in FIG. 4 to the position shown in solid lines in FIG. 4. As the selected record 106 is rolled radially from the position shown in dash lines in FIG. 4 to the position shown in solid lines in FIG. 4, the record moves axially and radially away from the support section 214 of the partition 202 while rolling radially inwardly and axially upwardly or outwardly on the central surface 208 to engage the record transfer assembly 108. Thus, by the provision of the support section 214 and the support surface 208 the record 106 is securely retained in a filing location intermediate a pair of partitions 202. When a selected record is to be removed from its filing location by the record transfer assembly 108, the record is rolled radially inwardly and axially upwardly on the sloping central support surface 208 into engagement with the record transfer assembly 108. It should be noted that the aforementioned combination of a support section and central surface 208 eliminates any necessity for the use of a record ejector system to move the record out of the storage magazine 104 into engagement with a record transfer assembly. By rolling the selected record up the central support surface 208 the record is moved both radially and axially relative to the record magazine 104 to engage the record transfer assembly 108.

RECORD TRANSFER AND RELEASE ASSEMBLIES

As is perhaps best seen in FIGS. 2 and 4, the record transfer assembly 108 includes a record lift arm or gripper frame assembly 300 which securely engages a selected record by means of a pair of retaining members or pads 302 and 304 which are mounted on an outer end portion of a semicircular or scythe shaped frame member 306. A clamp arm 308 is mounted on an inner end portion of the frame member 306. The clamp arm 308 is pivotally mounted at 310 (see FIG. 4) for movement outwardly into engagement with an outer edge or rim of a record under the force of a resilient spring 312 which engages an inner end portion of the clamp arm 308. The clamp arm 308 engages the outer rim of a record when the record is in the normal storage position indicated by dashed lines in FIG. 4. The clamp arm, under the urging of the spring 312, rolls the record 106 up the sloping central surface 208 into engagement with the retaining pads 302 and 304 (as indicated in solid lines in FIG. 4) to securely hold the record relative to the frame member 306. A pin member 316 extends through the clamp arm 308 into a transversely extending slot 318. As is perhaps best seen in FIG. 3, the pin member 316 extends through the frame member 306 and out of slots 318 formed on both sides of the frame member. The outwardly projecting pin 316 is engaged by a pawl 320 which presses the pin outwardly away from the records 106 (see FIG. 4) to hold the clamp arm 308 out of engagement with the records when the record magazine is being rotated to index the magazine to position a selected record adjacent to the record transfer assembly 108.

Once the selected record has been securely engaged by the frame assembly 300, the frame assembly 300 is rotated about a central axis of a stub shaft 324 which is mounted in a generally parallel relationship with the support frame 102 by a pair of brackets 326 and 328 (see FIG. 3). As the record 106 is rotated about the shaft 324, the record is removed or extracted from the record magazine 104 and rotated to a position slightly past a position indicated by dashed lines at 330 in FIG. 4. The frame assembly 300 is then rotated about a central axis of the frame, which is indicated by the center line 332 in FIG. 4, to position a selected side of the record 106 upwardly on the turntable 110. The direction of rotation about the axis 332 will, of course, determine which side of the record is positioned upwardly on the turntable. This rotation of the record about the central axis 332 of the frame assembly 300 occurs contemporaneously with a continued rotation of the frame assembly 300 about the shaft 324. Thus, after the record 106 has been rotated about the shaft 324 for a sufficient distance to clear the record magazine 104, the record is rotated about the axis 332 contemporaneously with continued rotation about the shaft 324 to position a preselected side of the record upwardly on the turntable 110.

The aforementioned combined rotation of the frame assembly 300 about the shaft 324 and the central axis 332 is obtained by means of a differential gear mechanism 340. The differential gear mechanism 340, as is perhaps best seen in FIGS. 3, 7 and 8, includes a pair of crown gears 342 and 344 which are mounted in a coaxial spaced apart relationship facing each other. The crown gears 342 and 344 are interconnected by a third crown gear 346 to form a differential gear assembly. The crown gears 342 and 344 are rotatably mounted on a central body 348 for rotation relative to each other (see FIG. 8). The central body 348 is connected at an outer end to the stub shaft 324 and an inner end to a second stub shaft 350 at an inner end. The stub shafts 324 and 350 are rotatably supported by the brackets 326 and 328. The crown gear 346 is fixedly mounted on a spindle shaft 350 which extends perpendicularly to a longitudinal axis of the body 348 and is mounted for rotation relative to the central body 348. Thus, the three crown gears 342, 344, and 346 are rotatable relative to each other and the central body 348 to form a differential gear assembly whose operation per se is well known to those skilled in the gearing art.

Figure 8:
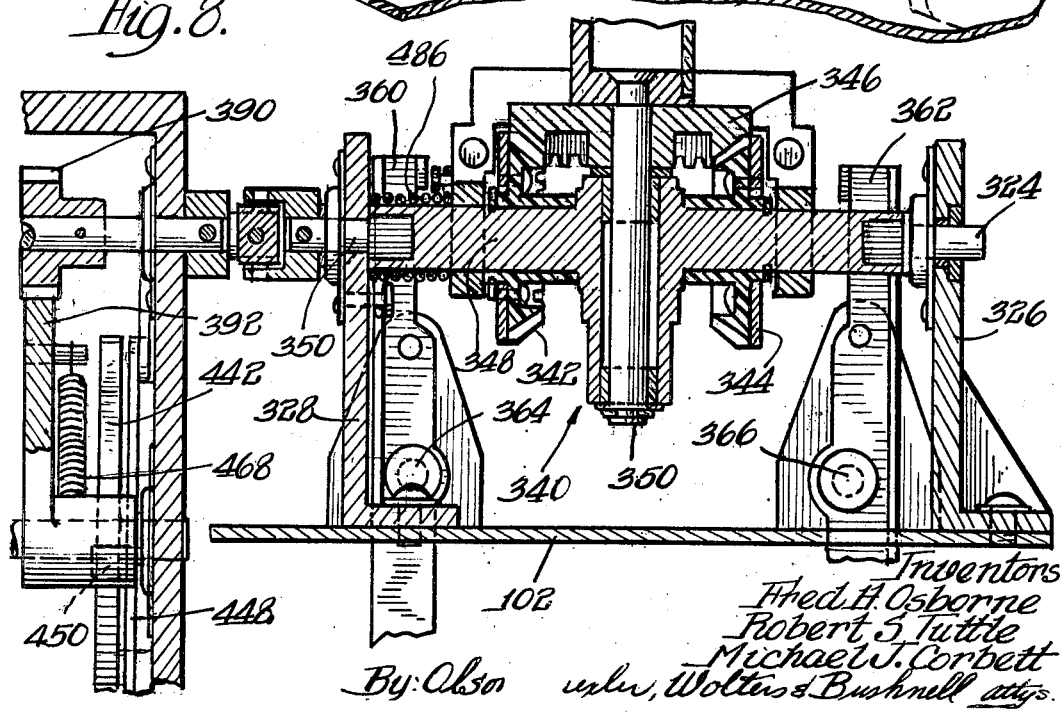
FIG. 8 is an enlarged fragmentary sectional view, taken along the line 8—8 of FIG. 7, illustrating the construction of the differential gearing assembly used with the record transfer assembly of FIG. 2.

A first pin 354 extends outwardly from the crown gear 344, and a second pin 356 extends outwardly from the crown gear 342 (see FIGS. 3 and 7). From a consideration of FIGS. 7, 9, and 10 it is apparent that the pins 354 and 356 are mounted for engagement with a pair of parallel upstanding stop members 360 and 362 when the differential gear assembly 340 and frame assembly 300 are rotated about the shaft 324. The stop members 360 and 362 are pivotally mounted at 364 and 366 for movement by a solenoid 368 through a suitable linkage 370 (see FIG. 7). The stop members 360 and 362 are urged toward the position shown in solid lines in FIGS. 9 and 10 by a spring 372 (see FIG. 9) which is connected to a lower end portion of the stop member 362. When the stop members 360 and 362 are positioned as shown in solid lines in FIG. 10, rotation of the differential gear assembly 340 about the shaft 324 causes the pin 356 to engage the stop member 360 while the pin 354 misses the stop member 362.

The aforementioned engagement of the pin 356 with the stop member 360 retains the crown gear 342 against further rotation and causes the differential gearing assembly 340 to differentiate. The differential gearing assembly 340 differentiates with the crown gear 342 held stationary by the stop 360, the crown gear 344 then continues to rotate about the shaft 324 while the crown gear 346 rotates relative to the crown gear 342. The rotation of the crown gear 346 rotates the frame assembly 300, about the axis 332, from the position shown in dashed lines at 330 of FIG. 4 to the position shown in dashed lines at 376 in FIG. 4 to locate a side of the record which faced toward the pin 356 in the record magazine 104 upwardly on the turntable 110.

When the solenoid 368 is energized, the stop members 360 and 362 are moved to the position indicated by dashed lines in FIG. 10. When the record 106 and frame assembly 300 are rotated about the shaft 324, with the stop members 360 and 362 positioned as shown in FIG. 10, the pin 354 will engage the stop member 362 to block the gear 344 against further rotation. When the pin 354 projecting from the gear 344 has been engaged by the stop 362, the frame assembly 300 and record 106 are rotated, due to continued rotation of the gear 344 and the start of rotation of the gear 346, about the central axis 332. Rotation about the axis 332 positions a second side of the record, that is, the side facing toward the pin 354 when a record is in the magazine 104, upwardly on the turntable 110. It should be noted that the pin 354 includes a relatively large head section 378 (see FIG. 10) which engages the stop member 362 to retain the stop member against movement, from the position shown in dashed lines to the position shown in solid lines in FIG. 10, under the influence of the spring 372 when the solenoid 368 is deenergized.

The differential action which occurs when the pin 354 engages the stop 362 is shown in greater detail in FIGS.

11, 12, and 13. The differential gear assembly 340 is shown in its initial position in FIGS. 11 and 12 (which corresponds to the position shown in FIG. 1) before the frame assembly 300 has been rotated about the shaft 324. As the frame assembly 300 is rotated to remove a record from the record magazine 104, the gear 344 is rotated until the pin 354 engages the stop member 362 as shown in FIG. 13. As the rotation of the frame assembly 300 is continued, the gear 344 is retained stationary, while the gears 342 and 346 are rotated to move the frame assembly 300 contemporaneously about the shaft 324 and about the central axis 332 of the frame assembly 300 to position a selected side of the record upwardly on the turntable. When the record is positioned on the turntable 110, the pin 354 is still positioned as shown in FIG. 13. As the record is positioned on the turntable with the preselected side upwardly, the pin 356 on the gear 342 engages a sensing or limit switch 380 (as shown in FIG. 15) to actuate a control circuit in a manner to be explained in greater detail subsequently. As is perhaps best seen in FIG. 14, a second sensing or limit switch 382 is provided for engagement by the pin 354 when the opposite side of the record is to be positioned upwardly on the turntable.

Figure 18:
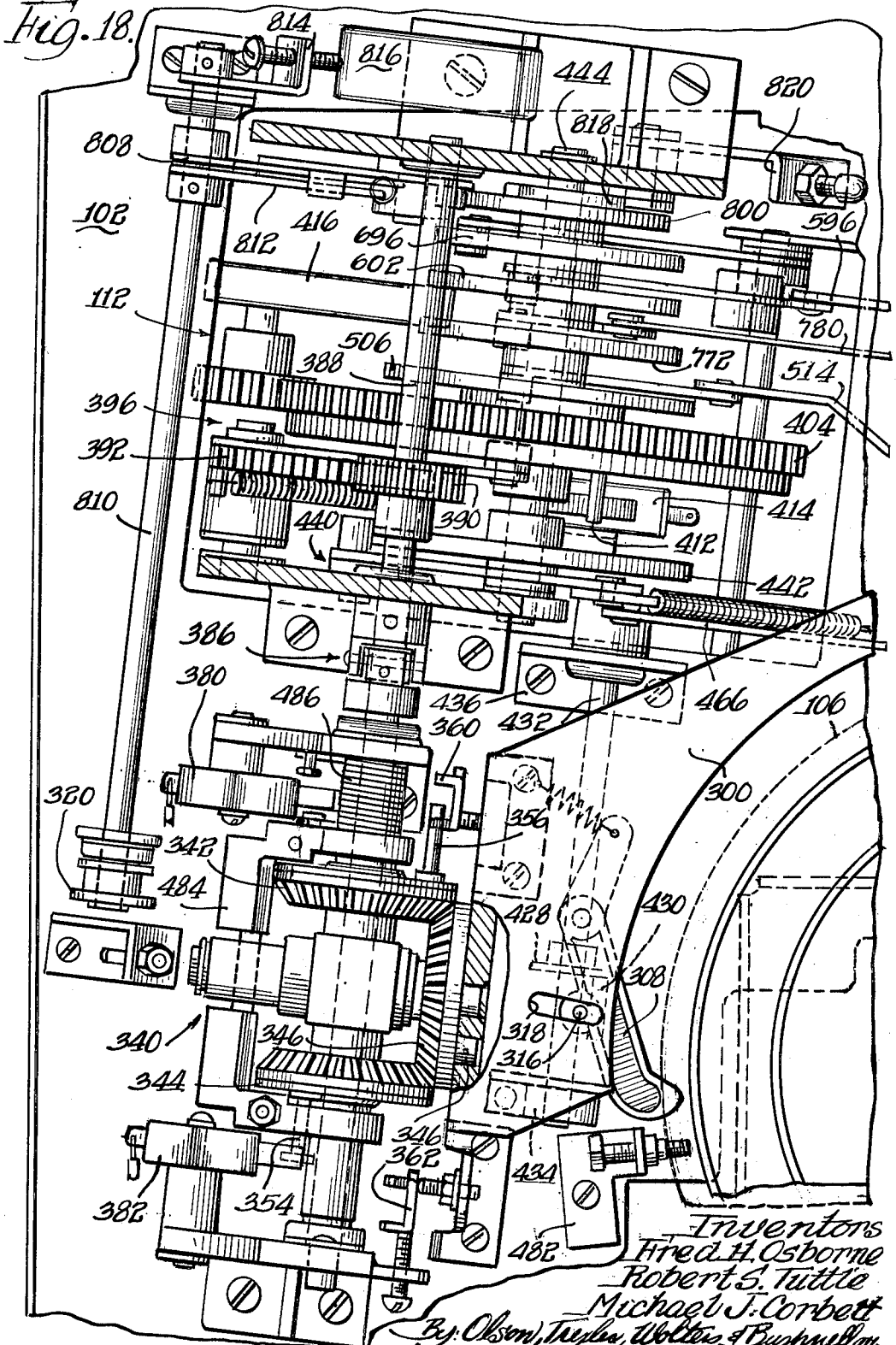

In view of the foregoing remarks it will be apparent that the differential gear assembly 340 serves to rotate the frame 300 in either a first direction or a second direction, about the central axis 332, depending upon whether a first side or a second side of the selected record is to be positioned upwardly on the turntable for engagement with the tone arm 114. The differential gear assembly is actuated by means of a pair of shiftable stop members 360 and 362 which block pins 354 and 356 to cause the differential gear assembly 340 to differentiate and rotate the selected record in a predetermined direction about the central axis 332 of the frame assembly 300. Of course, this rotation of the frame assembly 300 about its central axis 332 occurs after the selected record has cleared the record magazine while rotation about the shaft 324. The distance through which the record is rotated about the shaft 324 before the differential gear assembly 340 begins to differentiate is determined by the positioning of the pin 354 and 356 on the gears 342 and 344, and the relative location of the upper surfaces of the stop members 360 and 362. When the pins 354 and 356 engage the stop members 360 and 362, the differential gear assembly differentiates, in a known manner, to pivot frame assembly 300 and the selected record about the central axis of the frame assembly. This pivoting movement is combined with the continued rotation of the frame assembly 300 about the shaft 324 to position the selected record in a generally horizontal position as indicated at 376 in FIG. 4. When a first side of the record is to be positioned upwardly, the pin 356 engages a stop 360 to rotate the frame assembly 300 in a first direction to position the frame assembly and the selected record as shown in FIGS. 18 and 19. Conversely, when the pin 354 engages the stop member 362, the frame assembly 300 is rotated to the position shown in FIG. 2 to place the selected record on the turntable with a second side upwardly.

A drive and control assembly for the record transfer assembly 108 is shown in FIGS. 9, 16, 17, and 18. Referring now to FIG. 9, it can be seen that the differential gear assembly 340 is connected by a universal joint 386 to a shaft 388 in the control mechanism 112. A spur gear 390 is fixedly mounted on a shaft 388, and is positioned in driving engagement with a segment gear 392. Referring to FIG. 16, it can be seen that the segment gear 392 is pivotally mounted at 394 for arcuate movement to drive the spur gear 390 and shaft 388. When the spur gear 390 is rotated in a clockwise direction by the segment gear 392, the differential gear assembly 340 is rotated relative to the record magazine to remove a record from the record magazine. The segment gear 392 is rotated in a counterclockwise direction by the action of a cam assembly 396. The cam assembly 396 includes a follower arm 398 and a roller 400 which is positioned in engagement with a cam track 402. The track 402 is integrally formed with a main drive gear 404. When the main drive gear 404 is rotated, the follower arm 398 follows the cam track 402 to pivot the gear segment 392 outwardly from the position shown in FIG. 16 to the position shown in FIG. 17. As the segment gear 392 is pivoted outwardly, the spur gear 390 is rotated and the frame assembly 300 is rotated relative to the record magazine 104 to remove a selected record from the magazine and position the record on the turntable 110.

The segment gear 392 is connected to the follower arm 398 by a spring 408. The spring 408 enables the follower arm to be moved radially inwardly relative to the drive gear 404 from the position shown in FIG. 17 to the position shown in FIG. 16 even if the differential gear assembly 340 or the frame assembly 300 should jam and lock the shaft 380 against rotation due to some unforeseen circumstance. If the follower arm 398 is connected directly to the segment gear 392, the forces present in the drive assembly 396, when the shaft 380 is locked against rotation, would break down the drive assembly and render the entire mechanism inoperative. By the provision of the spring 408, the follower arm 398 can be moved independently of the segment gear 392. An adjustable stop means 410 is provided for adjusting the position of the segment gear 392 relative to the follower arm 398.

An axially outwardly extending pin 412 is mounted on the gear 404 (see FIGS. 9 and 16) for engagement with a sensing or limit switch 414, while the gear 404 is being rotated. The sensing switch 414 is connected to the control circuitry to prevent the record selection from being changed once the rotation of the gear 404 has begun.

The drive gear 404 is driven in a clockwise direction as viewed in FIG. 16 by a transmission assembly 416 which is connected to a drive motor 418. The transmission assembly 416 reduces the output of the drive motor 418 which is transmitted by a gear 420 to the transmission assembly 416. A flywheel 422 is connected to the output shaft to the motor 418 and is engaged by an electromechanical brake 424 which serves to stop the motor immediately upon deenergization of the motor. The brake 424 includes a solenoid which is energized to draw the brake out of engagement with the flywheel 422 when the drive gear 404 is to be rotated. When the drive gear 404 has been rotated for a predetermined distance, the solenoid for the brake 424 is released and the flywheel is again engaged by the brake to stop the gear in a predetermined location.

When the selected record has been positioned in a predetermined orientation on the turntable 110, that is with a preselected side of the record upwardly for engagement with the tone arm 114, the clamp arm 308 is disengaged from the record by a clamp arm release pawl or foot 428 (see FIGS. 15 and 18). The pawl 428 includes an outwardly extending arm 430 which engages the pin 316 to pivot the clamp arm 308 out of engagement with the selected record. The pawl 428 and arm 430 are fixedly secured to a transversely extending shaft 432 which is mounted for rotation by a pair of upstanding brackets 434, 436 (FIG. 18). The shaft 432 is rocked relative to the base structure 102 by means of a cam assembly 440 which is best seen in FIG. 20.

The cam assembly 440 includes a cam member 442 which is fixedly connected to a cam shaft 444. The cam shaft 444 is rotated by the main drive gear 404 which is also fixedly connected to the cam shaft 444. The rotation of the cam 442 pivots a follower linkage 446 to rock the shaft 432. The follower linkage 446 includes a follower arm 448 having a disc 450 positioned in engagement with an operating surface of the cam 442. The follower arm 448 is pivotally attached to a connector link 452. The connector link 452 is in turn pivotally attached to an upstanding drive lever 454 which is rotatably mounted on the shaft 432. The drive lever 454 is connected by a spring 456 to a follower lever 458 which is fixedly connected to the shaft 432. When the cam 442 is rotated, the disc 450 on the follower arm 448, is rocked outwardly by a nose or working section 460 of the cam 442 to move the connector link 452 rearwardly and, contemporaneously therewith, to pivot the drive lever 454 and the follower lever 458. The pivotal movement of the follower lever 458 rocks the shaft 432 and the arm 430 (see FIG. 18) to move the pin 316 in the slot 318. The movement of the pin 316 in the slot results in the clamp arm 308 being moved out of engagement with the selected record on the turntable 110.

Although the previously explained action of the cam 442 disengages the clamp arm 308 from the selected record, the selected record must also be disengaged from the retaining pads or members 302 and 304 (see FIGS. 18 and 19) before the record can be played by rotation of the turntable relative to the tone arm. The selected record is disengaged from the retaining members or pads 302 and 304 by moving the turntable relative to the frame assembly 300. The turntable 110 is moved relative to the frame assembly 300 by a linkage assembly 466 (see FIGS. 20 and 21) which is connected to the drive lever 454. The linkage assembly 466 is moved contemporaneously with the rocking of the shaft 432 by the cam 442. The movement of the linkage assembly 466 pivots the turntable 110 toward the cam shaft 444 and the center of the frame assembly 300 to disengage the record from the retaining pad or members 302 and 304.

As is perhaps best seen in FIGS. 20 and 22, the turntable 110 is mounted on a carriage 470 for movement relative to the base structure 102. The carriage 470 is moved relative to the base structure on a pair of cylindrical rollers 472 and 474 which are mounted in rolling engagement with the support structure 102. Referring to FIG. 22, the carriage 470 is pivoted around a suitable connection 476 by the linkage assembly 466 to move the carriage relative to the frame assembly 300 and to disengage the selected record 106 from the retaining pads 302 and 304. The carriage 470 is pivoted by the linkage 466 from the position shown in FIGS. 18 and 19, wherein the carirage 470 engages an outer stop member 480 and is spaced apart from an inner stop member 482, to a position shown in FIG. 22, wherein the carriage is positioned in engagement with the stop member 482 and is spaced apart from the stop member 480. This pivoting movement of the turntable 110 moves the selected record from a position engaging the retaining pads 302 and 304 (shown in FIGS. 18 and 19) to a position spaced apart from the retaining pads (shown in FIG. 22). Since the follower linkage 446 (see FIGS. 20 and 21) is moved by the cam 442 to contemporaneously move both the clamp arm 308 and the turntable carriage 470, the selected record is disengaged from the clamp arm 308 while being moved out of engagement with the retaining members or pads 302 and 304 to enable the record to be freely rotated by the turntable 110. Of course, when the nose or operating section 460 of the cam 442 is rotated past the disc 450, the turntable carriage 470 is moved outwardly into engagement with the stop 480, while the clamp arm 308 is released for engagement with the selected record to move the record into secure engagement with the retaining pads or members 302 and 304.

After the record has been played, the disc 450 moves off the nose of the cam 442 and the record is securely reengaged by the clamp arm 308 while the turntable carriage 470 is moved outwardly into abutting engagement with the stop 480. The record is now securely engaged by the record transfer assembly and is ready to be reinserted into the record magazine. The cam shaft 444 is then rotated by the motor 418 and the follower arm 398 is pivoted from the position shown in FIG. 17 to the position shown in FIG. 16. The movement of the follower arm 398 from the position shown in FIG. 17 to the position shown in FIG. 16 causes the segment gear 392 to rotate the spur gear 390 and to thereby rotate the record transfer assembly 108 to return the selected record to the record magazine.

When the frame assembly 300 was rotated to position the selected record on the turntable, the frame 300 was rotated about its central axis 332 (see FIGS. 11–15), by engagement of either the pin 354 or 356 with an associated stop member 360 or 362. The engagement of the pin corresponding to the side of the record to be played, with its associated stop member, rotated the frame 300 to position the selected side of the record upwardly on the turntable. This rotational movement of the frame 300 is reversed when the record is returned to the record magazine 104. The differential gear assembly 340 is differentiated, while the frame 300 is being rotated to replace a record in the record storage magazine 104, by means of a spring loaded bail 484 which is perhaps best seen in FIG. 3. The bail is pressed against the pins 354 and 356 by a spring 486 which is mounted on the body member 348 and tends to rotate the bail 484 relative to the body member 348.

When a selected record is placed on the turntable 110 the frame assembly 300 is rotated about the shaft 324 from the position shown in FIG. 1 to the position shown in FIG. 2. During this rotation the spring 486 presses the bail 484 against the pins 454 and 456 to urge the gears 342 and 344, and, consequently, the frame assembly 300 back to the position shown in FIG. 1. The force of the spring 486 is easily overcome by the drive gear 404 (see FIG. 16) and the associated driving assembly to pivot the frame assembly 300 about the shaft 324 to position a record on the turntable. However, as the frame assembly 300 is rotated to replace the record in the record magazine, the bail 484 presses against the pin associated with the selected side of the record to cause the differential gear assembly 340 to differentiate and rotate the frame assembly 300 about its central axis 332.

When the record 106 is returned to the record magazine 104 from the position shown in FIGS. 18 and 19, the bail 484 presses against the pin 354 to cause the gear 344 to rotate about the body member 348 and to rotate the gear 346 and the frame assembly 300 in the reverse of the rotation previously imparted for placing the selected record 106 on the turntable 110. Thus, as the record is returned to the record magazine 104 the differential gear assembly 340 differentiates, and the frame assembly 300 is rotated about its central axis 332 and about the shaft 324 to move the gears 342 and 344 to substantially the position shown in FIG. 7. When the gears 342 and 344 are in the position shown in FIG. 7, the bail 484 engages both pins 354 and 356 to rotate the frame about the shaft 324 while the gears 342, 344, and 346 remain substantially stationary relative to each other, that is without any differentiating of the differential gear assembly 340. Thus, by the engagement of the bail 484 with the pin 354 or 356 which does not engage a stop member 360 and 362 during the initial placement of the record, the bail causes the differential gear assembly 340 to reverse its previous differentiation as the record is being returned to the record magazine 104. This reversal of the previous differentiation moves the record from the orientation shown in dash lines at 376 in FIG. 4 to the orientation shown in dash lines at 330 in FIG. 4. The subsequent rotational movement of the frame 300 positions the record in the magazine as shown in solid lines in FIG. 4.

When the record has been positioned in the record magazine, as shown in solid lines in FIG. 4, the pawl 320 is rocked into engagement with the pin 316 to disengage the clamp arm 308 from the record. The record is then free to roll down the sloping surface 208 into engagement with the support section 214 of the associated partition 202. Thus, the record transfer assembly 108 utilizes the frame assembly 300 and the differential gear assembly 340 to both remove a selected record from the record storage magazine 104 and, conversely, to return the record to the record storage magazine.

TONE ARM ASSEMBLY

A tone arm assembly 500 is shown in FIGS. 19 and 23. The tone arm assembly 500 includes the tone arm 114, a drive assembly 502 for swinging the tone arm horizontally relative to the turntable 110, and a tone arm lift or drive assembly 504 (see FIG. 30) for moving the tone arm vertically relative to the turntable. The two drive assemblies 502 and 504 move the tone arm 114 horizontally over the selected record and vertically downwardly into engagement with the selected record to enable the record to be played by rotation of the turntable while the tone arm 114 is in engagement with the record. While the record is being played, the needle assembly 116 on the tone arm 114 engages the groove in the record to swing the tone arm 114 inwardly toward the center of the record while picking up the sound which has been recorded in the groove of the record in a known manner. After the record has been played, the two drive assemblies 502 and 504 move the tone arm 114 vertically upward out of engagement with the record and swing the tone arm back to its initial position shown in FIG. 19.

The tone arm 114 is swung in a substantially horizontal plane relative to the turntable under the action of a cam 506 which is best seen in FIG. 24. The cam 506 is fixedly mounted on the cam shaft 444 adjacent to the drive gear 404. The cam 506 is rotated by the cam shaft 444 to move a nose or operating section 508 of the cam into engagement with a follower disc 510 mounted on a follower lever 512. The follower lever 512 is a bell crank, and is connected by a link 514 (as shown in FIG. 24) to a drive arm or lever 516 (as shown in FIGS. 23 and 27) to swing the tone arm 114 relative to the turntable 110. The drive lever 516 is mounted for rotation relative to the tone arm 114, and is connected to the tone arm by the drive assembly 502.

As is perhaps best seen in FIG. 25 (on sheet 9 of the drawings), the drive lever 516 is connected by a spring 518 to a follower lever 520 which is also mounted for rotation relative to the tone arm 114. The drive lever 516 and the follower lever 520 engage an upstanding pin 522 which is connected to a positioning lever 524 to move the positioning lever contemporaneously with movement of the drive lever by the linkage 514. The positioning lever 524 is fixedly connected to the tone arm 114, and is moved contemporaneously with the tone arm 114. Thus, the drive lever 516 and the follower lever 520 are resiliently interconnected by the spring 518 to clampingly engage the pin 522 to pivot the tone arm 114 relative to the turntable 110 as the cam 506 is rotated on the cam shaft 444. As the drive lever 516 is moved relative to the base structure 102, the follower lever 520 engages a stop member 528 which is secured to the base structure 102 (see FIG. 26 on sheet 11 of the drawings). From a comparison of FIGS. 25 and 26 it is apparent that the engagement of the follower lever 520 with the stop 528 blocks the follower lever 520 against movement with the drive lever 516 so that the follower lever and drive lever are moved apart, as shown in FIG. 26, to free the positioning lever 524 from the clamping engagement of the follower lever 520 and drive lever 516. When the positioning lever 524 has been freed from the clamping engagement of the drive lever 516 and follower lever 520, the tone arm 114 is free to move under the inward swinging force exerted by a record groove on the needle assembly 116 to the position indicated in dashed lines in FIG. 26.

The construction of the tone arm assembly 500 is most clearly shown in FIG. 27. From an inspection of FIG. 27 it can be seen that the drive lever 516 and follower lever 520 are rotatably mounted on a fixedly mounted bushing 530 for rotation relative to the tone arm 114. It should be noted that the positioning lever 524 is fixedly secured to an internal sleeve 532 by a set screw 534 for rotation relative to the bushing 530, the drive lever 516 and the follower lever 520. The internal sleeve 532 is connected by a second set screw 536 to a connector or linkage assembly 538 and the tone arm 114. Thus, the follower lever 520 and drive lever 516 are freely rotatable on the bushing 530 relative to the tone arm 114 to enable the clamping engagement of the follower lever 520 and drive lever 516 with the positioning lever 524 to be selectively released. When the clamping engagement of the follower lever 520 and drive lever 516 has been released the tone arm 114 can move freely relative to both the follower lever 520 and the drive lever 516 by a recording groove on a selected record.

The tone arm 114 is moved radially inwardly relative to a record being played by the recording groove on the record until the end of both the groove and the record is reached. At the end of the record an inner end portion 540 of the positioning lever 524 engages an upright arm 542 of a sensing or limit switch 544 (see FIGS. 23, 28, 29). Actuation of the sensing switch 544 by the inner end 540 of the positioning lever 524 energizes a circuit to the motor 418 (see FIG. 16) to rotate the cam shaft 444 and cause the follower disc 510 (see FIG. 24) to move off the nose or operating section 508 of the cam 506 and swing the tone arm 114 back to the initial position shown in FIG. 19.

From the foregoing remarks it is apparent that the drive assembly 502 moves for a predetermined distance in clamping engagement with the positioning lever 524 to swing the tone arm 114 radially inwardly relative to a selected record mounted on the turntable 110. At the end of the predetermined distance, the follower lever 520 engages a stop 528. When the follower lever 520 engages the stop 528, the subsequent movement of the drive arm 516 results in a separation of the drive arm 516 relative to the follower arm 520, to free the positioning lever 524 and tone arm 114 for movement relative to the turntable 110. This movement is accomplished by movement of the disc 510 onto the nose 508 of the cam 506. The selected record is then played by rotating the turntable with the needle assembly 116 in engagement with a spiral recording groove on the record. The tone arm is moved radially inwardly relative to the record due to the interaction between the recording groove and the needle assembly 116. When the end of the record is reached the sensing switch 544 is actuated to energize the motor 418 and rotate the cam shaft 444. Rotation of the cam shaft 444 moves the disc 510 off the nose 508 of the cam 506 and the drive lever 516 is moved back into engagement with the positioning lever 524. The subsequent pivoting movement of the drive lever 516 moves the upstanding pin 522 of the positioning lever 524 from the position shown in FIG. 26 to the position shown in FIG. 25, that is into abutting driving engagement with the follower lever 520 as the tone arm 114 is swung back to its initial position under the action of the cam 506.

The relative positions of a record on the turntable 110 and the tone arm 114 when the switch 544 is actuated at the end of a record can be varied by a mounting assembly 548 which is shown in FIGS. 28 and 29. The mounting assembly 548 includes a bracket 550 which is fixedly mounted on the base structure 102. A second bracket 552 is pivotally connected to the bracket 550, and is urged toward the bracket 550 by a spring member 556 (see FIG. 29). A stop member 558 is mounted on the bracket 550 and is engaged by the upstanding switch arm 542. The position of the upstanding switch arm 542 relative to the body of the switch 544 can be altered by pivoting the bracket 552 relative to the bracket 550. The bracket 552 is pivoted relative to the bracket 550 by an adjusting screw 560 which is mounted on the bracket 552. By moving the bracket 552 relative to the bracket 550, the distance through which the end portion 540 of the position lever 524 must travel to actuate the switch 544 can be varied to coincide with the end of a groove formed in the records being played on the turntable 110. This enables the positioning lever 524 to engage the switch arm 542 at the end of a record to actuate the control circuitry to disengage the tone arm from the record and to return the record to the record magazine.

The connector assembly 538 (see FIG. 27) includes a drive arm 560 which is connected to the sleeve 532 by the set screw 536. A driven arm 562 is held in resilient abutting engagement by a spring 564 with an adjusting screw 566 which projects outwardly from the drive arm 560. The set screw 566 is adjustable to move the drive arm 560 relative to the driven arm 562 to adjust the position at which the tone arm initially engages a record on the turntable. The driven arm 562 is fixedly connected to the sleeve 532 by a lock ring 570. The tone arm 114 is mounted on the driven arm 562 by a pair of upwardly extending ears or tabs 572 and 574 on a pivot shaft 576. The tone arm 114 is rockably mounted on the pivot shaft, and is normally retained in a position substantially parallel to the base structure 102 by a counterweight 578 (see FIGS. 23 and 19) which offsets the mass of the outwardly extending tone arm. The connector assembly 538 enables the drive arm 560 to pivot radially outwardly under the action of the cam 506 even if the tone arm 114 catches or locks due to some unforeseen circumstance.

The tone arm 114 is moved vertically toward and away from the base structure 102 and a record mounted on the turntable 110 by a pushrod or shaft 580 which extends upwardly through a cylindrical passage in the center of a sleeve 532 to engage a downwardly projecting boss 582 which is integrally formed with the tone arm 114. The pushrod 580 is pressed downwardly, to enable the tone arm to move close to the base structure 102 and to engage a record on the turntable 110, by a spring 584. As is perhaps best seen in FIG. 30, the tone arm is moved vertically relative to a record by engagement of the tone arm lift assembly 504 with the pushrod 580. The tone arm lift or pivot linkage assembly 504 includes a downwardly extending bracket 586 which is connected to the support structure 102, a drive lever 588 which is pivotally mounted on the bracket 586, and a positioning lever 590 which is pressed against an adjusting screw 592 extending from the drive lever 588 by a spring 594. The drive lever 588 is rocked about the pivot point 595 by a link 596 which is connected to a follower lever 598. The follower lever 598 has a disc 600 for engaging a cam 602. The cam 602 is mounted for rotation on the cam shaft 444 and includes a major surface area 604 which is spaced a relatively large radial distance from the center of the cam and a working or operating surface area 606 which is spaced radially inwardly toward the center of the cam 602. When the follower disc 600 is in engagement with the major area 604 of the cam, the drive crank 588 is rocked to move the pushrod 580 upwardly to retain the tone arm 114 out of engagement with a record on the turntable. When the disc 600 engages the working or operating area 606 of the cam 602, the drive lever 588 is rocked downwardly, and the pushrod 580 is moved downwardly under the influence of the spring 584 to enable the tone arm 114 to move into engagement with a record on the turntable 110. The distance which the pushrod is moved relative to the tone arm 114 can be adjusted or varied by turning the adjusting screw 592 to move the positioning lever 590 relative to the pushrod 580.

In view of the foregoing remarks, it will be apparent that the movements of the tone arm 114 are controlled by two cams, that is the cams 506 and 602. The cam 506 moves a drive assembly 502 to swing the tone arm 114 inwardly from the position shown in FIG. 1 in vertical alignment with the beginning of a groove on a record positioned on the turntable 110 (as shown in FIG. 2). Contemporaneously with the swinging movement of the tone arm 114, the cam 602 moves the tone arm downwardly into engagement with the selected record on the turntable 110. The cams 506 and 602 are mounted on the cam shaft 444 in such a position relative to each other that the tone arm 114 swings downwardly into engagement with the record when the follower disc 510 for the cam 506 is on a substantially constant radius portion of the cam 506 as indicated at 610 in FIG. 24. After the tone arm is moved downwardly into engagement with the record, the cam 506 moves the drive assembly 502 still further to separate the drive lever 516 and follower lever 520 to enable the positioning lever 524 and tone arm 114 to pivot freely. The tone arm is then moved radially inwardly toward the center of the turntable by engagement of the needle assembly 116 with the radially inwardly spiraling recording groove in the record. When the needle has moved inwardly to the end of the spiral groove, the end portion 540 of the positioning lever 524 engages the switch arm 542 to actuate a control circuitry to energize the drive motor 418 and rotate the cam shaft 444. Rotation of the cam shaft swings the tone arm back by moving the cam 506 and the drive linkage 502 to their normal positions.

TURNTABLE

The construction of the turntable 110 is illustrated in FIG. 31. The turntable 110 includes an annular record supporting ring or platform 650 upon which a rubber mat 652 is placed for engagement with the inner or lower surface of a record being played on the turntable 110. A central housing 654 is connected to the platform 650 by means of a radially outwardly extending flange 656 which is connected to a depressed central portion 658 of the turntable. The central portion 658 is integrally formed with the platform 650. An axially downwardly extending generally cylindrical flange or skirt 660 is also integrally formed with the platform 650. The skirt 660 has a guideway or drive surface 662 formed in the side of the skirt for retaining a pair of drive belts or rings 664 and 666. The belts or rings 664 and 666 are both made in the form of a continuous loop, and are rotated by a drive assembly 668 (see FIG. 32) to rotate the turntable 110 on a bearing bushing 670 (see FIG. 31). A first relatively large diameter spindle 672 is positioned in sliding engagement with an inner surface of the housing 654. The spindle 672 has a relatively large diameter for engaging the relatively large aperture commonly found at the center of 45 r.p.m. records. A second spindle 674 having a relatively small diameter is centrally mounted relative to the spindle 672 and the housing 654. A body section 676 is integrally formed with the spindle 674 and extends downwardly into the housing 654. The body section 676 functions to hold a pair of latch fingers 678 and 680 outwardly in latching engagement with an annular plate 684 which is connected to the central portion 658 of the turntable. The spindle 674 has a diameter of approximately the same dimension as the diameter of an aperture found at the center of a 33⅓ r.p.m. record. The body section 676 has a somewhat larger diameter and engages the inner or lower surface of the record, as the record is positioned on the turntable 110, and is depressed downwardly into the housing 654 by the weight of the record.

When the body section 676 is depressed into the housing 654 by the placing of a 33⅓ r.p.m. record on the spindle 674, the latch fingers 678 and 680 no longer engage the relatively large lower portion of the body section 676, and move radially inwardly out of latching engagement with the plate 684. This disengagement of the latch fingers 678 and 680 from the plate 684 permits both the large spindle 672 and the relatively small spindle 674 to move downwardly relative to the housing 654, so that only the large spindle 674 projects above the plate 684 to engage a 33⅓ r.p.m. record. As the small spindle 674 moves downwardly into the housing 654, a central shaft or rod 688 is lowered to actuate a sensing or limit switch 690. The limit switch 690 actuates control circuitry to cause the drive assembly 668 (see FIG. 32) to rotate the turntable at 33⅓ r.p.m. rather than the normal 45 r.p.m. Thus, the two spindles 672 and 674 are operative to sense the speed at which a selected record should be played by sensing engagement of the spindles with an aperture formed in the center of the record. If the record has a relatively large aperture, the spindle 672 engages the aperture to retain the record in position on the turntable 110. However, if the record is to be played at 33⅓ r.p.m. and has a relatively small center aperture, the spindle 674 engages the aperture and a body section 676 is depressed to release the latch fingers 678 and 680. The releasing of the latch fingers 678 and 680 causes the two spindles 672 and 674 to move downwardly to actuate the switch 690 with the central rod 688.

In view of the foregoing remarks, the general structure and method of operation of the turntable 110 will be readily apparent to those skilled in the art. The details concerning the structure of the turntable 110 and the spindles 672 and 674 have not been set forth in this application. For those who are interested in such details, they can be found in copending application Ser. No. 561,768, for a Two-Speed Turntable for Automatic Phonograph, filed in the name of Robert S. Tuttle, on June 30, 1966. Although the turntable disclosed in the aforementioned application is specifically intended for use in the record changer or selector assembly of the present invention, it is apparent that other turntables whose construction is well known to those skilled in the art can be modified for use in the record changer or selector assembly set forth in this application.

The spindles 672 and 674 are moved from the recessed position within the housing 654 after a 33⅓ r.p.m. record has been played to the position shown in FIG. 31 by a turntable resetting assembly 694. The turntable resetting assembly 694 includes a cam 696 which is fixedly mounted on the cam shaft 444 for rotation with the cam shaft. The cam 696 includes a nose or operating section 698 which is engaged by a cam follower lever 700. The cam follower lever 700 is connected to an operating lever 702 so that when the cam follower lever 700 is rocked by the cam 696, the operating lever 702 rocks upwardly to press a forked or bifurcated turntable reset lever 704 against a lift washer 706 which is fixedly mounted on the central rod 688. The cam 696 is rotated once during each cycle of operation of the automatic record changer assembly 100. During each cycle of rotation the follower lever 700 is rocked by the cam 696 to press the reset lever 704 upwardly to enable the latch fingers 678 and 680 to engage the plate 684.

The cam 696 is oriented on the cam shaft 444 in such a position that the record transfer assembly drive cam 402 actuates the record transfer drive assembly to remove the selected record from the turntable before the cam 696 rocks the follower arm 700 to lift the spindles 672 and 674 upwardly. If a 45 r.p.m. record has just been played on the turntable 110, the resetting action of the cam 696 merely lifts the spindles 672 and 674 a very slight distance upwardly, while the latch fingers 678 and 680 remain in engagement with the plate 684. However, if a 33⅓ r.p.m. record has just been played on the turntable 110, the reset lever 704 engages the lift washer 706 at a position substantially below that shown in FIG. 31. The action of the nose 698 of the cam 696 on the follower arm 700 then causes the reset lever 704 to lift the spindles 672 and 674 to the position shown in FIG. 31 to enable the latch fingers 678 and 680 to reengage the plate 684.

TURNTABLE DRIVE ASSEMBLY

The turntable drive assembly 668 includes a motor 710 which is mounted on a support plate 712 suspended from the turntable carriage 470 on vibration absorbing mountings 714 (see FIGS. 33 and 34). A drive shaft 716 extends from the motor 710 and is frictionally engaged by a drive wheel 718. The drive wheel 718 is fixedly connected to a sheave or pulley 720. The pulley 720 is engaged by the belts or rings 664 and 666 so that rotation of the drive wheel 718 and pulley 720 rotates the turntable 110 due to the frictional engagement of the belts 664 and 666 with the depending skirt or flange 660 of the turntable. The drive shaft 716 includes a first section 722 having a relatively large diameter, and a second section 724 having a relatively small diameter. The drive wheel 718 is selectively movable in an axial direction for engagement with either the section 722 or 724 of the drive shaft 716. When a 33⅓ r.p.m. record is to be played on the turntable 110, the drive wheel 718 is positioned in engagement with the relatively small section 724 of the drive shaft. Similarly, when a 45 r.p.m. record is to be played on the turntable 110, the drive wheel 718 is positioned in engagement with the relatively large diameter section 722 of the drive shaft. Of course, the relatively large section 722 of the drive shaft 716 rotates the drive wheel 718 at a higher rate than the relatively small section 724 of the drive shaft.

Referring now to FIGS. 33 and 34, it can be seen that the drive wheel 718 is mounted on a lever 728 which is in turn mounted on an upwardly extending post or shaft 730. A solenoid 732 is connected to a bell crank mounting assembly 734 which is pivotable about a transversely extending pivot shaft or pin 735 to raise a drive washer 736 and the mounting lever 728 and drive wheel 718 relative to the drive shaft 716. As is perhaps best seen in FIG. 35, the bell crank mounting assembly 734 includes a pair of crank arms 740 and 742 which are interconnected by a pin 746. A central bushing 748 is mounted on the pivot shaft 735 to hold the crank arms 740 and 742 in spaced apart relationship. A pair of drive arms 750 and 752 extend inwardly from the crank arms 740 and 742 to engage the drive washer 736 to lift the lever 728 and the drive wheel 718 upwardly into engagement with the relatively small diameter section 724 of the drive shaft 716. The solenoid 732 is energized by a circuit extending from the switch 690 (see FIG. 32) which is actuated by the central rod 688 of the turntable 110 when a 33⅓ r.p.m. record is placed upon the turntable. Therefore, whenever a 33⅓ r.p.m. record is to be played, the solenoid 732 is energized by the actuation of the switch 690 to raise the drive wheel 718 axially relative to the drive shaft 716 so that the drive wheel engages the relatively small section 724.

The construction of the drive wheel 718 and the pulley 720 is illustrated in FIG. 36. The pulley 720 includes a downwardly extending mounting section 758 which is engaged by a plurality of inwardly extending gears or tangs 760 of the drive wheel 718. The drive wheel 718 includes an outer rim or tire 762 of a suitable elastomeric material which is securely bonded to a central disc 764 with which the tangs 760 are integrally formed. The tangs 760 are positioned in fixed engagement with the mounting section 758 of the pulley 720, so that the drive wheel 718 and pulley 720 rotate as a unit on an upwardly extending post or shaft 768 to transmit rotation from the drive shaft 716 to the turntable 110.

The mounting of the support lever 728 on the upwardly extending post 730 is also clearly shown in FIG. 36. The support lever 728 is connected to the bushing 732 which is positioned in sliding engagement with the post 730. The bushing and support arm 728 are urged downwardly relative to the post 730 by a spring 734 which is mounted coaxially with the post 730. The inwardly extending drive arms 750 and 752 of the mounting assembly 734 engage the drive washer 736 to move the bushing 732 and support arm 728 upwardly against the force of the spring 734 when the solenoid 732 is energized.

The support lever 728 is pivoted relative to the shaft 730 in response to a control cam 772 which is best seen in FIG. 37. The control cam 772 normally maintains a follower lever 774 in the position shown in FIG. 37.

Figure 39:
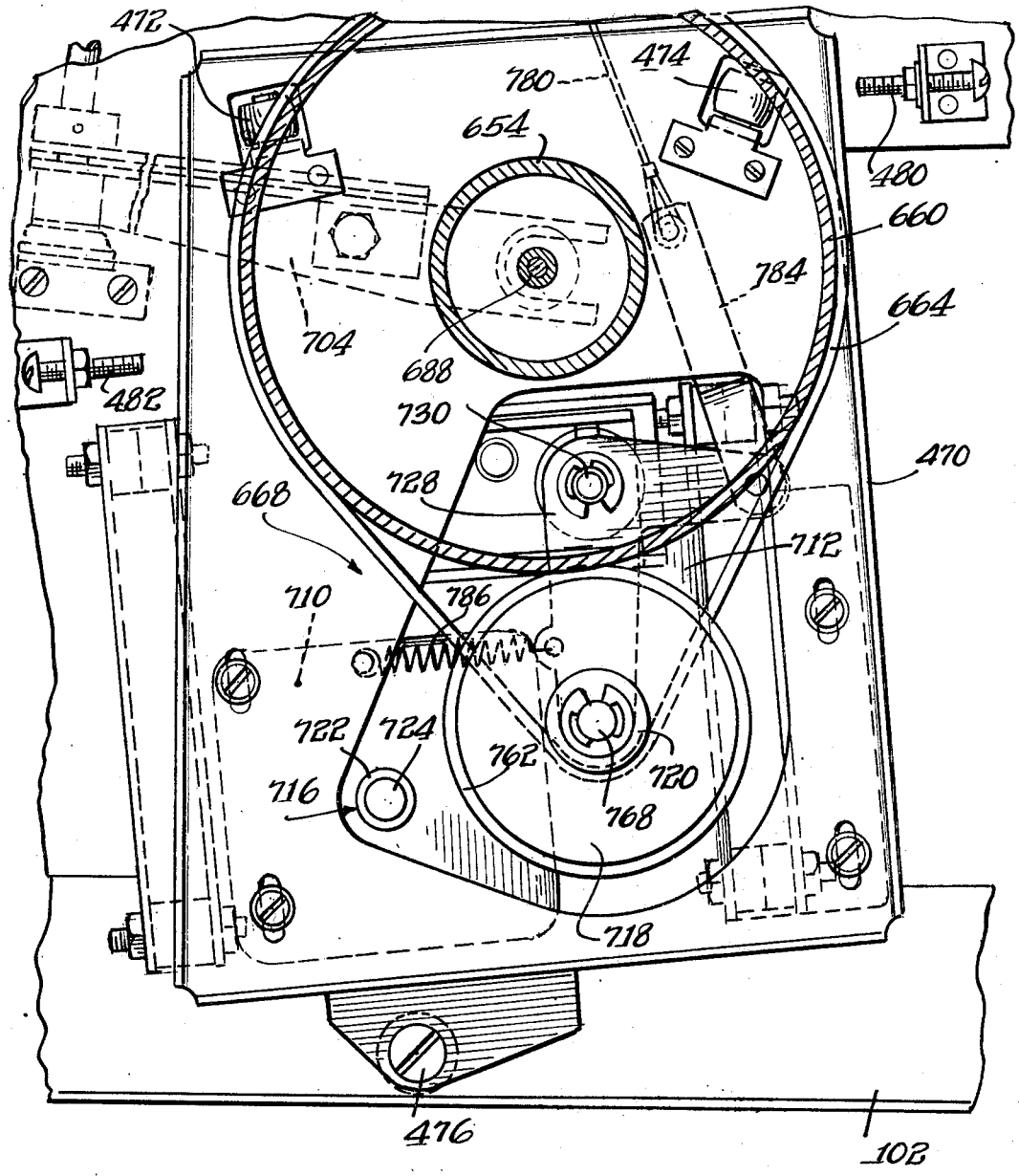
FIG. 39 is an enlarged plan view, similar to FIG. 38, illustrating the turntable drive assembly of FIG. 32 with the drive wheel of FIG. 36 spaced from the drive shaft of the turntable drive motor under the influence of the linkages of FIGS. 37 and 38.

However, when a follower disc 776 on the follower lever 774 engages an operating or working section 778 of the cam, the follower lever is rocked forwardly to provide slack in a wire rope or cable 780 which is connected to the support lever 728. The wire rope or cable 780 extends around a pulley 782 (see FIGS. 37 and 38) to engage a connector link 784 which is best seen in FIG. 38. The connector link 784 is connected to the support arm 728 to pivot the arm about the upstanding shaft or post 730. The drive wheel 718 is normally maintained out of engagement with the drive shaft 716, as shown in FIG. 39, when the follower lever 774 is positioned as shown in FIG. 37. When the follower disc 776 engages the operating section 778 of the cam 772, the follower lever 774 is rocked forwardly to enable the support lever 728 to pivot the drive wheel 718 into engagement with the drive shaft 716 under the urging of a spring 786. Thus, the turntable 110 is only rotated during the period of time in which the follower disc 776 is in engagement with the operating section 778 of the cam 772. It should be noted that the upward movement of the drive wheel 718 relative to the drive shaft 716 to engage the drive wheel 718 with the relatively small diameter section 724 of the drive shaft 716 occurs when the drive wheel is in engagement with the drive shaft. However, when the support lever 728 and drive wheel 718 are returned to their normal position opposite the relatively large diameter section 722 of the drive shaft 716, the drive wheel is pivoted out of engagement with the drive shaft 716 so that the rim 762 of the drive wheel is not unduly worn by sliding outwardly against the force of the spring 786 as the wheel moves from the relatively small section 724 of the drive shaft to the relatively large section 722.

As is perhaps best seen in FIG. 39, the drive assembly 668 is mounted on the turntable carriage 470 for pivotal movement relative to the support structure 102. Thus, both the turntable 110 and the turntable drive assembly 668 are pivotally movable relative to the support structure 102 to disengage a record from the record transfer assembly. By mounting the drive assembly 668 for movement contemporaneously with the turntable 110, positive engagement of the drive assembly with the turntable at all positions of the turntable is assured.

Turning now to consideration of FIG. 40, a cam 800 is mounted on the cam shaft 444 to actuate a follower linkage 802 at the end of each cycle of operation of the automatic record changer assembly 100. The linkage 802 includes a follower lever 804 which is connected by a link 806 to a drive lever 808 which is rotatably mounted on a shaft 810. The drive lever 808 is connected to a driven lever 812 by a spring 814. The driven lever 812 is fixedly mounted on the shaft 810 and rocks the shaft 810 contemporaneously with movement of the drive lever 808. An actuator lever 814 is also fixedly connected to the shaft 810, and is rocked contemporaneously with the rocking movement of the driven lever 812. As is perhaps best seen in FIG. 41, the actuator lever is mounted to operate a switch 816. The actuation of the switch 816 opens a control circuitry to end the operation cycle of the automatic record changer assembly 100.

A cam 818 is mounted for engagement with a follower linkage 820 to operate a switch 822. The operation of the switch 822 serves to disconnect the cam shaft drive motor 418 (see FIG. 16) from a source of electrical power to prevent the cam shaft 444 from being rotated while a selected record is being played on the turntable. If the cam shaft 444 should be rotated while the record is being played, the various control cams would be actuated to disengage the tone arm from the record and to engage the record with the record transfer assembly to return the record to the record magazine before the selected record had completed playing.

CONTROL ASSEMBLY

The control unit 112 is perhaps best seen in FIGS. 9 and 18. The control unit 112 consists of a plurality of cams mounted on the cam shaft 444 and the record transfer assembly drive mechanism 396 (see FIG. 16 also). The various cams have previously been discussed in connection with the particular component of the automatic record changer assembly with which they are associated. However, it is believed to be advantageous at this time to consider the interrelationship of the cams and the various components of the automatic record changer assembly. At the outset it should be noted that each of the cams is fixedly mounted on the cam shaft 444 to maintain a constant relationship between the cams so that each of the components of the automatic record changer assembly is actuated in a predetermined sequence by the cams.

The order in which the cams are mounted on the cam shaft 444 is perhaps best seen in FIG. 9. Starting from the left end of the cam shaft 444, as seen in FIG. 9, it can be seen that the cam 442 is mounted adjacent to the left end of the shaft for actuating the linkage 440 to move the turntable 110 relative to the base structure 102 while, contemporaneously therewith, disengaging the record clamp arm 308 from the selected record 106 (see FIGS. 20 and 22). The main drive gear 404 is mounted immediately adjacent to the cam 442. As is best seen in FIGS. 16 and 17, the main drive gear 404 controls the rotation of the segment gear 392 which, as seen in FIG. 9, rotates the shaft 388 to drive the record transfer assembly 108. The next cam in sequence on the cam shaft 444 is the cam 506 which is connected by a link 514 to operate the drive assembly 502 and swing the tone arm 114 relative to the turntable 110 (see FIGS. 24 and 27). Cam 772 is positioned adjacent to the cam 506. As is best seen in FIG. 37, cam 772 actuates the follower lever 774 to pivot the drive wheel 718 into and out of engagement with the drive shaft 716 to rotate the turntable 110 as shown in FIG. 39. Cam 602 is positioned next to cam 772 and controls the vertical movement of the tone arm 114 (see FIG. 30) in the manner previously explained. Cam 696 is positioned adjacent to the cam 602 and controls the resetting of the turntable 110 after a record has been played by means of a linkage assembly 694 which is best seen in FIG. 31. Cam 800 is positioned adjacent to the cam 696 on the cam shaft 444 for actuating the end of cycle switch 816, as shown in FIGS. 40 and 41. Last, but not least, is cam 818 which controls the actuation of the switch 822 to disable the drive motor for the cam shaft when the turntable is being rotated while a record is being played. Although it has been found by experimentation that the foregoing order of cams on the cam shaft 444 lends itself to a relatively simple arrangement of linkages which do not interfere with each other, it will be apparent that the order of the cams on the cam shaft 444 can be changed, However, it is necessary that the cams be fixed relative to each other on the cam shaft to maintain a predetermined sequence of operation of the automatic record changer 100.

The control mechanism 112, by utilizing a plurality of coaxially mounted cams, is both compact and highly dependable in its operation. This compact control mechanism coordinates the movements of the record transfer assembly 108, the turntable 110, the tone arm 114, and the turntable drive assembly 118. In addition the control mechanism 112 includes the record transfer assembly drive mechanism 696 which rotates the cam shaft 444 and powers the record transfer assembly 108. Although the combined cam and linkage arrangement of the control mechanism 112 is relatively complex, the particular linkage for moving a particular component in a particular manner is comparatively simple and trouble-free in its operation. Since the cams are all fixedly connected to a common cam shaft 444, the cams are rotated in unison to provide a predetermined sequence of operation of the record changer assembly 100.

A control circuitry 850 is illustrated in FIG. 42. The control circuitry 850 includes a pair of power lines 852 and 854 which are connected to a suitable source of power. A selector switch 856 is connected to a remote record selection station of known construction. When the selector switch 856 is actuated by the selection of a record for playing, a record magazine drive motor 858 is energized to rotate the record magazine 104 relative to the record selector assembly 108. The record magazine drive motor 858 is energized over a circuit extending from the power lead 852 through the lead 860 to the switch 856 and then to the record magazine drive motor 858 over a lead 862. The circuit for energizing the record magazine drive motor is completed by a lead 864 which is connected to a contact of the switch 816 which is closed by the cam 800 (see FIG. 40) at the start of an operation of the automatic record changer assembly 100. The switch 816 is connected by lead 866 to contacts 868 of the cam actuated switch 822 (see FIG. 40). The contacts 868 of the cam actuated switch 822 are connected by leads 870 and 872 to the power lead 854.

As the record magazine 104 is being rotated relative to the base structure 102, either a first switch 876, corresponding to a first or "A" side of a record, or a second switch 878, corresponding to a second or "B" side of a record, is actuated. Whether the switch 876 or the switch 878 is actuated by the rotation of a selector mechanism depends upon whether the A or the B side of the record was selected for playing. The selector mechanism which is associated with the record magazine 104 can advantageously be constructed as set forth in copending application Ser. No. 619,686, "Electromechanical Selector Unit" filed in the names of Frank B. Lumney and Ronald P. Eberhardt. Although the aforementioned selector assembly is preferred for use in the automatic record changer 100, it will be apparent to those skilled in the art that known automatic selectors can be modified for use with the record changer assembly 100. Since the selector mechanism does not form a novel part of the present invention, and because selector mechanisms which can be used with the automatic record changer assembly 100 are well known to those skilled in the art, the details of the structure of a selector mechanism have not been set forth in this application.

Assuming that the first or A side of a record has been selected for playing, the switch 876 is closed when the record magazine 104 is indexed to a position in which the selected record is adjacent to the record transfer assembly 108. The selector switch 856 is opened contemporaneously with the closing of the A side selector switch 876 to deenergize the record magazine drive motor 858. Closing or actuation of the switch 876 energizes the A side control relay 880. The energization of the A side control relay blocks the relay in an energized state over its own normally open contacts 882 which are connected by leads 884 and 886 to the A side control relay 880. The A side control relay 880 is in turn connected to the power line 854 by the lead 888. The relay contacts 882 of the A side control relay 880 are connected by a lead 890 to the normally closed limit sensing switch 380 which is in turn connected to the power line 852 by a lead 892. Thus, energization of the A side control relay 888 completes a holding or locking circuit through the contacts 882 of the A side control relay and the switch 380. The A side selector switch 876 is released shortly after its actuation by the selector mechanism so that the relay 880 is retained in an energized state over its own made contacts 882.

The solenoid 368 for controlling the positioning of the stop members 360 and 362 (see FIGS. 9 and 10) is energized to pivot the stop member 362 into a position wherein it can be engaged by the pin 354 as the record transfer assembly 108 transports the selected record from the record magazine 104 to the turntable 110. The solenoid 368 is energized by power conducted from the power line 852 over the lead 898 to contacts 900 of the A side control relay 880, which are in turn connected by a lead 902 to the solenoid 368. The circuit for energizing the solenoid 368 is completed by a lead 904 to the power line 854.

Energization of the 880 relay also closes relay contacts 906 which are connected to the power line 852 by the lead 898. The contacts 906 are connected to a main control relay 908 by leads 910 and 912. The circuit for energizing the main control relay 908 is completed to the power line 854 by a lead 914. Energization of the main control relay closes the normally open contacts 916 of the relay 908. The cam shaft motor 418 is then energized over leads 918, 920, and 922 which interconnect the cam shaft motor 418 with the power line 852 and the relay contacts 916. The circuit for energizing the cam shaft motor 418 is completed from the relay contacts 916 over leads 924, 926, and 866 to the normally closed contacts 868 of the switch 822, which are in turn connected by the leads 870 and 872 to the power line 854. Thus, energization of the A side control relay 880 completes a circuit to energize the main control relay 908 which in turn completes a circuit through the contacts 868 of the cam operated switch 822 to energize the cam shaft drive motor 418.

Energization of the cam shaft drive motor 418 rotates the main drive gear 404, as previously explained in connection with FIGS. 16 and 17, to operate the record transfer assembly 108 which engages the selected record in the record magazine 104 and transfers the selected record to the turntable 110 with the selected side up, that is, the first or A side up. Contemporaneously with this transporting of the selected record from the record magazine 104, the cam 800 is rotated on the cam shaft 444 to move the contactor bar 930 of the switch 816 from the position shown in FIG. 42 in engagement with the contact 932 to a position in engagement with a contact 934. It should be noted that the actuation of the switch from engagement with the contact 932 to the contact 934 enables the cam shaft drive motor 418 to be energized through the switch 816 and the contact 868 of the switch 822. In addition, the actuation of the switch 816 by the cam 800 prevents the record magazine 104 from being moved relative to the support structure 102 so that the storage location for the selected record remains adjacent to the record transfer assembly 108. Shortly after the switch 816 is actuated by the cam 800, the pin 412 in the main drive gear 404 (see FIG. 16) engages the switch 414 (not shown in FIG. 42) which actuates known circuitry extending to a remote record selection station to lock the record selection mechanism against the changing of the selected record. The circuit for doing this is well known to those skilled in the art, and has not been included in this application.

When the record has been removed from the record magazine, rotated by the record transfer assembly, and positioned on the turntable with the selected side upwardly, the pin 356 engages the switch arm of the limit switch 380 to open the holding circuit for the A side control relay. Opening of the switch 380 breaks the holding or locking circuit for the relay 880 so that the relay is deenergized. Deenergizing the relay 880 opens the contacts 906 of the relay to deenergize the main control relay 908 which had previously been held energized by a circuit extending through these contacts. When the main control relay 908 is deenergized, the contacts 916 of the relay 908 are opened so that the cam shaft drive motor 418 is no longer energized over these contacts. However, the cam shaft drive motor 418 is still energized over a circuit extending through the switch 816 which has been actuated so that the contactor bar 930 engages the contact 934, and through the contacts 868 of the switch 822.

Contemporaneously with the opening of the limit switch 380 by the pin 356, the positioning of the selected record on the turntable 110 actuates the switch 690 if the selected record is a 33⅓ r.p.m. record. The switch 690 is actuated by a releasing of the latch fingers 678 and 680

(see FIG. 31) to enable the shaft 688 to engage and close the normally open switch 690. Closing of the switch 690 energizes the solenoid 732 by power conducted over leads 936 and 938 from the power lines 852 and 854. The energization of the solenoid 732 moves the drive wheel 718 from the position shown in FIG. 32, in engagement with the large diameter section 722 of the drive shaft 716, to a position engaging the relatively small diameter section 724 of the drive shaft, as shown in FIG. 33. As previously explained, when the drive wheel 718 is in engagement with the relatively small diameter section 724 of the drive shaft 716 the turntable 110 is rotated at 33⅓ r.p.m. by the motor 710.

As the cam shaft 444 continues to rotate under the influence of the motor 418, the tone arm 114 is swung inwardly and downwardly into engagement with an initial portion of the spiral groove on the selected record under the influence of cams 506 and 602 (see FIGS. 23, 24, and 30). When the tone arm 114 has been moved into position on the selected record, the cam 818 rocks the follower linkage 820 (see FIG. 40) to actuate the switch 822. Actuation of the switch 822 opens the switch contacts 868 over which the cam shaft drive motor 418 was previously energized to halt the rotation of the cam shaft 444. Contemporaneously with the opening of the switch contacts 868 of the switch 822, switch contacts 940 of the switch 822 are closed to energize the turntable drive motor 710 over leads 942, 944 and 946 to rotate the turntable and a selected record relative to the tone arm 114. As the selected record is played by the rotation of the turntable and the engagement of the tone arm 114 with the selected record, the tone arm is pivoted inwardly under the action of a recording groove in the record until the switch 544 is actuated by the tone arm drive assembly 502 (see FIG. 23) at the end of the record.

Actuation of the switch 544 by the tone arm 114 completes a circuit for energizing the cam shaft drive motor 418. The cam shaft drive motor 418 is now energized over a circuit including the leads 920, 922, contact 934 of switch 816, leads 866, 926, and 924 which are connected to the tone arm limit or sensing switch 544. The tone arm limit or sensing switch 544 is in turn connected to the power line 854 by leads 948 and 872. The energization of the cam shaft drive motor 418 over the aforementioned circuit rotates the cam shaft 444 to actuate the switch 822 to the position shown in FIG. 42, that is with the contacts 868 closed and the contacts 940 open. Opening the contacts 940 interrupts the energization circuit for the turntable drive motor. The continued energization of the cam shaft drive motor 418 causes the cam shaft 444 to rotate and move the tone arm 114 out of engagement with the record in the manner previously explained. However, the cam shaft drive motor 418 remains energized, over a circuit extending through switches 816 and 822, to drive the record transfer assembly 108 and return the selected record from the turntable to the record magazine.

The continued rotation of the cam shaft drive motor 418, in positioning the record back in the record magazine, rotates the cam 800 so that the switch 816 is pivoted to the position shown in FIG. 42, that is with the contactor bar 830 in engagement with the contact 932. When the switch is in this position, the cam shaft motor 418 is deenergized and the record magazine drive motor 858 can again be energized by the selection of a second record which closes the selector switch 856.

If the second or B side of the record had been selected for playing, the B side selector switch 878 would have been closed to energize the B side control relay 952. Energization of the B side control relay 952 closes the contacts 954 and 956 of the B side control relay 952. The closing of the normally open contacts 956 of the B side relay 952 locks the B side relay in an energized state through a circuit extending from the power line 852 over a lead 956 which is connected to the limit or sensing switching 382. The limit or sensing switch 382 is in turn connected by a lead 958 to the relay contacts 956 which are connected to the B side control relay 952 by leads 960 and 962. The circuit for energizing the B side control relay 952 is completed by the lead 964 which extends from the B side control relay 952 to the power line 854. The main control relay 908 would also be energized by the operation of the B side control relay 952.

The circuit for energizing the main control relay, when the B side control relay 952 is energized, includes a lead 966 which is connected to the power line 852 and to the relay contacts 954 of the B side control relay 952. The contacts 954 are in turn connected by leads 910 and 912 to the main control relay 908. The circuit for energizing the main control relay 908 is completed by the lead 914 which is connected to the power line 854. The further operation of the circuit 850 is substantially the same with the B side control relay 952 energized as was the operation of the circuit 850 when the A side control relay 880 was energized. However, when the B side of the record is to be positioned upwardly on the turntable 110 for engagement with the tone arm 114, the pin 354 opens the sensing or limit switch 382 to deenergize the B side control relay 952 after the record has been positioned on the turntable.

A modified form of the record chamber assembly 100 is illustrated in FIG. 43 which is generally similar to FIG. 7. In the modified form of the invention a control or safety interlock switch 972 is inserted in the circuit 850 between the record magazine drive motor 858 and the contact 932 (see FIG. 42). The switch 972 is actuated by a pin or arm 974 which extends outwardly from the clamp arm 308 to actuate the normally open switch 972, as shown in FIG. 43. When the normally open switch 972 is actuated by the pin 974 the frame 306 is in the pick-up position 276 and the pin 316 is moved rearwardly in the slot or aperture 318 so that the clamp arm 308 is spaced apart from the records 106 in the record magazine 104. The record magazine drive motor 858 can be energized only when the switch 972 is closed. Therefore, in the modified form of the invention, the record magazine drive motor can be energized only when the clamp arm has been moved radially into a spaced apart relationship with the records 106 by the pawl 320. It is apparent that if the record magazine 858 should be energized when the clamp arm 308 is not held in a spaced apart relationship with the records 106 by the pawl 320, the records would be broken or damaged by the relative movement between the clamp arm and the record magazine.

METHOD OF OPERATION

The operation of the automatic record changer assembly 100, constructed as illustrated in FIGS. 1 to 42, will be largely apparent from the foregoing description. However, for purposes of affording a more complete understanding of the invention, a functional description of the mode in which the record changer assembly 100 operates is now provided. At the beginning of a cycle of operation of the automatic record changer assembly 100, the record changer assembly is substantially in the initial position shown in FIG 1. In this initial position, the record clamp arm 308 is positioned inwardly, from the position shown in FIG. 4, by the pawl 320 so that the record magazine 104 can be rotated relative to the base structure 102 until a selected record is positioned adjacent to the record transfer assembly 108. The pawl 320 is held inwardly by the cam 800 (FIG. 40) which is positioned with its nose or operating section in engagement with the follower disc on the follower lever 804. When the cam is in such a position, the shaft 810 is rocked in a clockwise direction as viewed in FIGS. 40 and 4. The clockwise rotation of the shaft 810 moves the pawl inwardly to engage the pin 316 to move the pin in a slot 318 to hold the clamp arm 308 out of engagement with the record 106. In the initial position of the automatic record changer assembly 100, the main drive gear 404 is positioned as shown in FIG. 16 so that the record transfer assembly 108 is positioned as shown in FIG. 1. The turntable carriage 470 is positioned as shown in FIGS. 18 and 19, that is in engagement with the stop member 480 and separated from the stop member 482. When the turntable is in this position, the cam 442 is substantially in the position shown in FIG. 20. The tone arm 114 is swung outwardly away from the turntable 110, as shown in FIG. 1, and is raised relative to the turntable, under the action of the cams 506 and 602 which are in substantially the position shown in FIGS. 24 and 30. The turntable itself is set for 45 r.p.m. records as shown in FIG. 31. However, the cam 696 will have rotated from the position shown in FIG. 31 so that the nose or working section 698 of the cam has moved out of engagement with the follower lever 700. The drive wheel 718 is initially positioned in a spaced apart relationship relative to the drive shaft 716 of the motor 710 under the action of a cam 772, which is initially positioned substantially as shown in FIG. 37. The control circuitry 850 will be substantially as shown in FIG. 42. It should be noted that the cam 800 is positioned with its nose or operating section closing the switch 816 as well as rotating the shaft 810 to retain the clamp arm 308 out of engagement with the records in a record storage magazine 104.

When a particular record is selected for playing, the selector switch 856 is actuated to energize the record magazine drive motor 858 which rotates the record magazine 104 to locate the selected record adjacent to the record transfer assembly 108 in the loading position 276 (see FIG. 3). When the selected record has been positioned adjacent to the record transfer assembly 108, either the A or the B side selector switches 876 and 878 will be operated. For purposes of this illustration it will be assumed that the B side of the record was selected. The switch 878 will, therefore, be actuated for a very short period to energize the B side control relay 952 which will be locked up over its own normally open contacts 956. Contemporaneously with the energization of the B side control relay 952, the main control relay 908 will be energized to energize the cam shaft drive motor 418 over relay contacts 918 and contacts 868 of cam operated switch 822. The cam shaft drive motor 418 will rotate the cam shaft 444. The follower disc on the cam follower lever 804 will move off the nose or operating section of the cam 800 to rock the shaft 810 in a counterclockwise direction. The rocking of the shaft 810 in a counterclockwise direction will release the clamp arm 308 for movement under the influence of the spring 312 (see FIG. 4). The clamp arm will then move outwardly to engage the selected record 106, and roll the record up the central surface 208 into engagement with the record retaining pads 302 and 304 as indicated in solid lines in FIG. 4. It should be noted that the switch 816 (see FIGS. 40 and 42) will be actuated contemporaneously with the releasing of the clamp arm 308 by the counterclockwise rotation of the shaft 810.

The cam shaft motor 418 will continue to rotate, being energized over a circuit including the switches 816 and 822, to move the drive gear 404 in a clockwise direction as seen in FIG. 16. The clockwise rotation of the drive gear 404 will cause the follower wheel 400 to pivot the lever 398 upwardly to rotate the segment gear 392 and the spur gear 390. The rotation of the spur gear 390 will rotate the shaft 388. When the shaft 388 is rotated, the record transfer assembly 108 will be rotated about the central axis of the shaft 324 (see FIG. 9). The rotation of the record transfer assembly 108 about the shaft 324 will move the selected record into the position indicated in dotted lines at 330 in FIG. 4. When the record transfer assembly is moved to substantially the position at 330 in FIG. 4, the pin 356 on the gear 342 of the differential gear assembly 340 will engage the stop member 360 (see FIGS. 9 and 10). The engagement of the pin 356 with the stop member 360 will retain the gear 342 against further rotational movement. This stopping or blocking of the rotation of the gear 342 will cause the differential gear assembly 340 to differentiate, with the bail 484 being pressed from the position shown in FIGS. 9 and 11, to the position shown in FIG. 14, by the pin 354 of the gear 344 of the differential gear assembly. As the differential gear assembly 340 differentiates, the gear 346 will be rotated, by movement relative to the stationary gear 342, to rotate the frame assembly 300 about its central axis 332 to position the selected record as indicated in dashed lines at 376 in FIG. 4. The selected record will now be positioned on the turntable 110 as shown in FIGS. 18 and 19. Contemporaneously with the positioning of the record on the turntable, as shown in FIGS. 18 and 19, the pin 354 will actuate the switch 382 to deenergize the B side control relay 952 which had previously been held energized over a circuit extending from the switch 382 to the normally open contacts 956 of the B side control relay 952. The deenergization of the B side control relay 952 will deenergize the main control relay 908 and open the contacts 916. The cam shaft drive motor will remain energized through the cam operated switches 816 and 822.

If the selected record was a 45 r.p.m. record, the turntable 110 will remain in the position shown in FIG. 31. However, if the selected record was a 33⅓ r.p.m. record, the relatively small aperture in the center of the record will engage the spindle 674, and the lower surface of the record will engage the body section 676 to release the latch fingers 678 and 680 to cause the large diameter spindle 672 to be retracted within the housing 654. (It should be remembered that the cam 696 has been rotated and the nose portion 698 does not engage the follower lever 700, as shown in FIG. 31, so that the turntable reset lever 704 has been rocked downwardly from the position shown in FIG. 31. If a 33⅓ r.p.m. record had been placed on the turntable 110, the push rod 688 will actuate the switch 690 to energize the solenoid 732. Energization of the solenoid 732 will pivot the bell crank mounting assembly 734 to lift the drive wheel 718 for engagement with the relatively small diameter section 724 of the drive shaft 716. However, if the 45 r.p.m. record was selected for playing on the turntable, the switch 690 would not be actuated and the drive wheel 718 would remain as shown in FIG. 32, that is in contact with the relatively large diameter section 722 of the drive shaft 716.

As the cam shaft 444 continues its rotation, the nose or operating section 460 of the cam 442 (see FIG. 20) will engage the disc 450 of the follower arm 448 to rock the shaft 432 in a counterclockwise direction. This counterclockwise movement of the shaft 432 rocks the arm 430 (see FIG. 18) into engagement with the selected record. Contemporaneously with this movement of the clamp arm 308, the follower linkage 446 will move the turntable on its carriage 470 (see FIGS. 20 and 22) to move the selected record out of engagement with the record retaining members 302 and 304, as shown in FIG. 22. The selected record is now free of the record transfer assembly 108 and can be readily rotated by the turntable 110. It should be noted that the follower disc 450 will remain in contact with the nose or operating section 460 of the cam 442 during the entire playing period of the selected record.

The cam shaft drive motor 418 remains energized to rotate the cam shaft 444 still further. The additional rotation of the cam shaft 444 will cause the follower lever 774 (see FIG. 37) to engage the operating section 778 of the cam 772 to swing the drive wheel 718 from the position shown in solid lines in FIG. 39 to the position shown in dashed lines in FIG. 39. When the drive wheel 718 is in the position shown in dashed lines in FIG. 39, the rotation of the drive shaft 716 by the motor 710 will be transmitted to the turntable 110 by the belts 664 and 666 when the turntable drive motor 710 is energized. The continued rotation of the cam shaft 444 will also rotate cam 506 (see FIG. 24) to engage the follower disc 510 on the follower arm 512 with an approach section of the nose 508 or operating section for the cam 506. This engagement of the follower arm disc 510 with the approach section of the cam will cause the link 514 to operate the drive assembly 502 to swing the tone arm 114 over the selected record on the turntable 110. When the tone arm has been positioned over the record on the turntable 110, the follower disc 600 (see FIG. 30) on the follower arm 598 will begin to ride off the major section 604 of the cam 602 onto the operating section 606 of the cam 602. This movement of the follower disc 600 will cause the tone arm to be lowered onto the record on the turntable 110. Contemporaneously with this lowering of the tone arm, the cam 506 will be further rotated so that the follower disc 510 will engage the outer portion of the nose or operating section 508 of the cam. When the follower disc 510 is in engagement with the radially outermost portion of the nose 508 of the cam 506, the follower lever 520 of the tone arm drive assembly 502 will have moved into engagement with the stop 528, and the drive lever 516 will have moved apart from the follower lever 520 (see FIG. 26) to enable the positioning lever to pivot freely relative to the base structure 102. It should be noted that the drive lever will move past the ponit shown in FIG. 26 so that the positioning lever 524 can freely move to the position shown in dotted lines in FIG. 26 to engage the switch arm 542.

Going back slightly in our sequence of events, contemporaneously with the engagement of the needle assembly 116 of the tone arm 114 with the selected record, the cam 818 will rock the follower lever 820 to actuate the switch 822 to open the switch contacts 868 which will deenergize the cam shaft drive motor, which was previously energized, over the switch contacts 868. Contemporaneously with the opening of the switch contacts 868, the switch contacts 940 are closed to energize the cam shaft drive motor 710 to rotate the turntable 110 and the selective record relative to the tone arm 114. As the selected record is rotated relative to the tone arm, the tone arm will be swung radially inwardly as the record is being played toward the center of the record by the conventional spiral groove which is formed on the record. When the tone arm reaches the end of the spiral groove, at the end of the playing of the record, the outer section 540 of the positioning lever 524 will engage the switch arm 542 (see FIGS. 23 and 27) to close the switch 544. Closing of the switch 544 will provide a circuit for reenergizing the cam shaft drive motor 418 to rotate the cam shaft 444. The rotation of the cam shaft 444 will rotate the cam 818 to open the switch contacts 940 and deenergize the turntable drive motor 710, while closing the switch contacts 868 to provide a circuit for the energization of the cam shaft motor 418.

Further rotation of the cam shaft 444 by the cam shaft drive motor 418 will result in the tone arm 114 being swung back to its initial position, as shown in FIG. 1, under the combined action of cams 506 and 602. Contemporaneously with this movement of the tone arm 110, the drive wheel 718 will be moved out of engagement with the drive shaft 716 of the turntable drive motor 710 under the action of the follower disc 776 on the arms 774 as the follower disc moves off the operating section 778 of the cam 772 (see FIG. 37). This movement of the drive wheel 718 out of engagement with the drive shaft 716 will insure that the turntable 110 will stop rotating.

The drive gear 404 is rotated still further by the cam shaft drive motor 418 so that the follower disc 450 moves off the nose or operating section 460 of the cam 442. The turntable carriage 470 will then be pivoted from the position shown in FIG. 22 to the position shown in FIGS. 18 and 19. Contemporaneously with the pivoting movement of the turntable, the shaft 432 will be rotated to release the clamp arm 308 for engagement with the record on the turntable. The record is now securely clamped within the record transfer assembly 108 for movement back to its original filing position in the record storage magazine 104. This movement of the record transfer assembly 108 occurs as the main drive gear is rotated from the position shown in FIG. 17 toward the position shown in FIG. 16. This movement of the drive gear causes the segment gear 392 to pivot inwardly toward the cam shaft 444 to rotate the shaft 388 in a counterclockwise direction. As the shaft 388 is rotated in a counterclockwise direction, the bail 484 will be urged by the spring 486 to rotate the pin 354 and the gear 344 of the differential gear assembly 340 from the position shown in FIG. 18 to the position shown in FIG. 7. As the gear 344 is rotated, the differential gear assembly 340 will differentiate because the gear 342 is blocked against movement by the stop member 360. The differentiation of the differential gear assembly 340 will pivot the frame assembly 300 about the central axis 332 from the position indicated at 376 in FIG. 4 to the position indicated at 330 in FIG. 4. When the frame assembly 300 has been pivoted to the position shown at 330 in FIG. 4, the bail 484 will engage both the pins 354 and 356, as shown in FIG. 7, to move the frame assembly 300 from the position shown at 330 in FIG. 4 to the position shown in solid lines in FIG. 4 to return the record to its filing location in the record magazine 104. Thus, the record transfer assembly 108 is rotated under the influence of the track cam 402 to reposition the record back in its predetermined filing location in the record magazine 104.

As the record is being replaced back into the record storage magazine by the record transfer assembly 108, the nose or operating section 698 of the cam 696 will rock the follower arm 700, as shown in FIG. 31, to reset the turntable 110 for playing a 45 r.p.m. record. If the record which had just been played was a 45 r.p.m. record, the reset lever 704 will merely press the two spindles 672 and 674 a slight distance upwardly. On the other hand, if the record had just been played with a 33⅓ r.p.m. record, the reset lever 704 would move the central rod 688 out of engagement with the switch 690, and would move the spindle 672 upwardly out of the housing 654 to enable the latch fingers 678 and 680 to engage the plate 684.

Further rotation of the cam shaft 444 will cause the nose or operating section of the cam 800 (FIG. 40) to engage the follower disc of the follower arm 804 to rock the shaft 810 in a clockwise direction as viewed in FIG. 40. This clockwise rotation of the shaft 810 will cause the pawl 320 (see FIG. 4) to engage the pin 316 and move the clamp arm 308 out of engagement with the record which had just been played. As the clamp arm 308 moves out of engagement with the just played record, the record will roll down the central surface 208 from the position shown in solid lines in FIG. 4 to the position shown in dashed lines in FIG. 4. As the shaft 810 is rocked under the influence of the cam 800, the switch 816 will be actuated by the actuator lever 814 to move the contactor bar to the position shown in FIG. 42, that is, in engagement with the contact 932 to deenergize the cam shaft drive motor 418. The cycle of operation for the playing of a record is then completed, and the record changer assembly 100 is ready for the selection of the next record.

Although a specific record magazine structure has been illustrated herein as cooperating with a particular tone arm 114 and turntable 110 under the control of a control mechanism 112, it will be apparent to those skilled in the art that many changes can be made in the specific structure shown. Therefore, it should be understood, of course, that the invention is not limited to the particular structure shown herein; and it is contemplated to cover by the appended claims any such modifications as fall within the true spirit and scope of the invention.

We claim:

1. A record changer comprising: a base means; a record magazine having a generally circular shape mounted on said base means for holding a plurality of records; a turntable mounted on said base means with a central axis of the turntable extending in a generally parallel relationship with a central axis of said record magazine; and a record transfer assembly mounted on said base means for moving a selected record from said record magazine to said turntable, said record transfer assembly includes a frame means on which both a record engaging member and a record clamp arm are mounted and said generally circular shaped record magazine includes a radially outwardly sloping central surface, said record clamp arm being movable relative to said frame means to engage a selected record in said record magazine and to move the selected record radially inwardly on said central surface to position the selected record between said record clamp arm and record engaging member to enable said record transfer assembly to securely grip the selected record.

2. A record changer comprising: a base means; a record magazine having a generally circular shape mounted on said base means for holding a plurality of records; a turntable mounted on said base means with a central axis of the turntable extending in a generally parallel relationship with a central axis of said record magazine; and a record transfer assembly mounted on said base means for moving a selected record from said record magazine to said turntable, wherein: said transfer assembly includes a frame means on which both a record retaining member and a record clamping arm are mounted for securely engaging an outer edge of a record; and said turntable is mounted for movement relative to said record retaining member to disengage the outer edge of a record from said retaining member to enable a record positioned on said turntable by said record transfer assembly to be rotated by said turntable.

3. A record changer comprising: a base means; a record magazine having a generally circular shape mounted on said base means for holding a plurality of records; a turntable mounted on said base means with a central axis of the turntable extending in a generally parallel relationship with a central axis of said record magazine; and a record transfer assembly mounted on said base means for moving a selected record from said record magazine to said turntable, a tone arm mounted on said base means for movement in a first direction generally parallel to the central axis of the turntable and a second direction generally perpendicular to the central axis of the turntable; a control mechanism mounted on said base means and connected to said record transfer assembly and said tone arm for driving said record transfer assembly to move a selected record from said record magazine to said turntable while coordinating the movements of said record transfer assembly and tone arm relative to said turntable, said tone arm being moved in said first and second directions by said control mechanism after a record has been positioned on the turntable by said record transfer assembly to enable a needle means in the tone arm to be positioned in sensible contact with a groove formed in the record, a tone arm drive assembly connecting said control mechanism to said tone arm to move said tone arm in the second direction; said tone arm drive assembly including a first lever means connected to said control mechanism, a second lever means connected to said tone arm, a third lever means resiliently connected to said first lever means to urge said second lever means into engagement with said first lever means to contemporaneously move said second lever means and tone arm for a first predetermined distance relative to said turntable, and a stop means mounted on said base means for engagement with said third lever means when said second lever means and tone arm have moved for said first predetermined distance relative to said turntable to enable said tone arm and second lever means to be moved for a second predetermined distance relative to said turntable by the groove in the record on the turntable.

4. A record changer comprising: a base means; a record magazine having a generally circular shape mounted on said base means for holding a plurality of records; a turntable mounted on said base means with a central axis of the turntable extending in a generally parallel relationship with a central axis of said record magazine; and a record transfer assembly mounted on said base means for moving a selected record from said record magazine to said turntable, said turntable and a turntable drive means are mounted on a base plate which is connected to said base means, said turntable being movable on said base plate relative to said record transfer assembly and said base means to position the selected record in a spaced-apart relationship relative to the record transfer assembly while the record and turntable are being rotated by said turntable drive means.

5. A record changer as set forth in claim 4 wherein: said turntable drive means includes a motor means having an outwardly extending drive shaft, an idler shaft rotatably mounted in a substantially parallel relationship with said drive shaft, a drive wheel fixedly mounted on said idler shaft for functional engagement with said drive shaft, a pulley means mounted on said idler shaft for rotation with said idler shaft, and a belt means interconnecting said pulley means and turntable whereby said drive shaft is rotated by said motor to drive said drive wheel and pulley means to rotate said turntable.

6. A record changer as set forth in claim 5 wherein: said drive shaft has a first section of a relatively small diameter and a second section of a relatively large diameter; and shift means is supported by said base plate for selectively moving said drive wheel from operative engagement with said second section of said drive shaft into operative engagement with said first section of said drive shaft to selectively vary the rate of rotation of said turntable.

7. A record changer as set forth in claim 6 further including: sensor means supported by said base plate and connected to said shift means for sensing the speed at which a record is to be played and actuating said shift means in accordance with the sensed record speed.

8. A record changer comprising: a base means; a record magazine having a generally circular shape mounted on said base means for holding a plurality of records; a turntable mounted on said base means with a central axis of the turntable extending in a generally parallel relationship with a central axis of said record magazine; and a record transfer assembly mounted on said base means for moving a selected record from said record magazine to said turntable, wherein: said record transfer assembly includes a differential gear mechanism supported by said base means and a frame means connected to said differential gear mechanism for gripping a selected record in said record magazine, said frame means being selectively rotatable for a first predetermined distance about a first axis by said differential gear mechanism to remove a selected record from said record magazine, and said frame means being contemporaneously rotatable for a second predetermined distance about said first axis and about a second axis by said differential gear mechanism to move the selected record into a predetermined position on said turntable.

9. A record changer as set forth in claim 8 further including: control means connected to said record transfer assembly and to said turntable for releasing a record clamping member mounted on said frame means when the selected record is in the predetermined position on the turntable and for contemporaneously therewith moving the turntable relative to the frame means to disengage the frame means from the selected record to enable the selected record to be freely rotated by the turntable.

10. A record changer as set forth in claim 9 further including: a drive means connected to said turntable, said drive means being actuatable to rotate said turntable at a plurality of rates of rotation; and a sensor means connected to said drive means and supported by said base means for sensing which of said plurality of rates of rotation the selected record is to be played at and actuating said drive means in accordance with the sensed selected record playing rate to enable said drive means to rotate said turntable at the sensed selected record play rate.

11. A record changer as set forth in claim 9 further including: a tone arm mounted on said base means for movement in a first direction generally parallel to the central axis of the turntable and a second direction generally perpendicular to the central axis of the turntable; and a linkage means connecting said tone arm to said control means, said control means moving said tone arm in said first and second directions after the selected record has been disengaged from said frame means to enable the tone arm to engage a groove in the selected record as the record is rotated by the turntable.

12. An automatic record changer assembly comprising: a base means; a record storage assembly supported by said base means; a turntable supported by said base means for rotation relative to said base means, said turntable being movable relative to said base means from an initial position to a playing position; a record transfer mechanism supported by said base means for moving a selected record from said storage assembly onto said turntable, said record transfer mechanism including members for engaging a selected record as it moved from said storage assembly to said turntable by said record transfer mechanism; and a control mechanism connected to said turntable to move said turntable from said initial position to said playing position when the selected record is positioned on the turntable by said record transfer mechanism, said record engaging members being disengaged from the selected record by the movement of the turntable from the initial position to the playing position to enable the selected record to be readily rotated by the turntable relative to the base means.

13. An automatic record changer assembly as set forth in claim 12 further including: a tone arm supported by said base means adjacent to said turntable; and wherein said record transfer mechanism includes a plurality of gear means interconnected to form a differential gear mechanism and a stop means which is selectively movable relative to said differential gear mechanism from a first position to a second position, said stop means in said first position being engaged by a first gear means to cause said record transfer mechanism to position a first side of the selected record upwardly on said turntable for engagement with said tone arm and said stop means in said second position being engaged by a second gear means to cause said record transfer mechanism to position a second side of the selected record upwardly on said turntable for engagement with said tone arm.

14. An automatic record changer assembly as set forth in claim 13 further including: a first drive means interconnecting said tone arm and said control mechanism to move said tone arm radially relative to said turntable when the selected record has been positioned on the turntable by said record transfer mechanism and the turntable has been moved from the initial position to the playing position by said control mechanism; and a second drive means interconnecting said tone arm and said control mechanism to move said tone arm axially relative to said turntable when the selected record has been positioned on the turntable by said record transfer mechanism and the turntable has been moved from the initial position to the playing position by said control mechanism, the combined radial and axial movements of said tone arm under the influence of said first and second drive means positioning said tone arm in engagement with the select record.

15. An automatic record changer assembly as set forth in claim 14 wherein: said first drive means includes a first lever means connected to said control mechanism, a second lever means connected to said tone arm, a third lever means resiliently connected to said first lever means to urge said second lever means into engagement with said first lever means to contemporaneously move said second lever means and tone arm for a first predetermined distance relative to said turntable, and a stop means mounted on said base means for engagement with said third lever means when said second lever means and tone arm have moved for said first predetermined distance relative to said turntable to enable said tone arm and second lever means to be moved for a second predetermined distance relative to said turntable by a groove in the selected record.

16. An automatic record changer assembly as set forth in claim 14 further including: a turntable drive assembly supported by said base means for rotating said turntable and the selected record relative to said base means, said turntable drive assembly being connected to said control mechanism and selectively energized by said control mechanism when the selected record has been positioned on the turntable by said record transfer mechanism.

17. An automatic record changer assembly as set forth in claim 12 wherein: said record transfer mechanism includes a record clamp arm which is mounted for movement relative to said record engaging members to roll the selected record in said record storage assembly into engagement with said record engaging members and to resiliently retain the selected record in engagement with said record engaging members as the selected record is moved from said record storage assembly onto said turntable by said record transfer mechanism, said clamp arm being disengaged from the selected record by the control mechanism as said turntable is moved from the initial position to the playing position by said record transfer mechanism.

18. An automatic record changer assembly as set forth in claim 17 wherein: said record storage assembly has a generally circular configuration with central surface sloping radially outwardly toward a plurality of radially outwardly extending partitions defining a plurality of record storage locations, the selected record being rolled radially inwardly on the central surface by said clamp arm to move the selected record into engagement with the record engaging members to enable the record to be securely gripped by said record transfer mechanism.

19. A record changer assembly comprising: a base means; a record storage structure supported by said base means for holding a plurality of records; a turntable supported by said base means; a turntable drive assembly supported by said base means to rotate said turntable relative to said base means; a record transfer assembly supported by said base means to transport records from said record storage structure to said turntable; a tone arm supported by said base means for engaging a record on said turntable as said turntable is rotated by said turntable drive assembly; and a control assembly supported by said base means and utilizing a plurality of cams to coordinate movements of said turntable, record transfer assembly and tone arm relative to each other and said base means, said plurality of cams including a first cam means associated with said record transfer assembly to actuate said record transfer assembly to transport a selected record from said record storage structure to said turntable, a second cam means associated with said turntable drive assembly to control the energization of said turntable drive assembly and the rotation of said turntable, a third cam means associated with said tone arm to move said tone arm radially relative to the selected record on the turntable, and a fourth cam means associated with said tone arm to move said tone arm axially relative to the selected record on the turntable.

20. A record changer assembly as set forth in claim 19 further including: a fifth cam means associated with said turntable and said record transfer assembly, said fifth cam means actuating said record transfer assembly to release a selected record positioned on said turntable and to contemporaneously move said turntable relative to said record transfer assembly to disengage the selected record from the record transfer assembly.

21. A record changer assembly as set forth in claim 19 wherein: said third cam means is connected to said tone arm by a tone arm drive assembly, said tone arm drive assembly including a link means connected to a follower means associated with said third cam means, a first member connected to said link means and movable relative to said tone arm, a second member fixedly connected to said tone arm, and a third member resiliently connected to said first member and movable relative to said tone arm to urge said second member into abutting engagement with said first member, whereby said tone arm is moved contemporaneously with movement of said link means by said third cam means; and a stop means supported by said base means for engaging said third member to provide relative movement between said third and first members to enable said second member and said tone arm to move independently of said first and third members.

22. A record changer assembly as set forth in claim 19 wherein: said record transfer assembly includes a frame means which is connected to a differential gear mechanism, said frame means being rotated about a first axis by a drive assembly connected to said first cam means to remove a selected record from said record storage structure, said frame means being rotated about a second axis by said differential gear mechanism to position a selected side of a record relative to said turntable for engagement by said tone arm.

23. A record changer assembly as set forth in claim 19 wherein: said turntable drive assembly includes a motor means having an outwardly extending drive shaft, an idler shaft mounted adjacent to said drive shaft, a drive wheel mounted on said idler shaft for operative engagement with said drive shaft, a pulley means mounted on said idler shaft in a fixed relationship with said drive wheel, and a belt means connecting said pulley means to said turntable whereby rotation of said drive wheel by said drive shaft rotates said turntable relative to said base means; and wherein said control mechanism includes a fifth cam means which is connected to said turntable drive assembly to selectively move said drive wheel into and out of engagement with said drive shaft to selectively rotate said turntable.

24. A record changer assembly as set forth in claim 23 wherein: said second cam means includes a cam follower means for selectively opening and closing a switch means in a circuit for energizing said motor means, said second cam means operating said cam follower means to close said circuit when said tone arm is moved into engagement with the selected record by said third and fourth cam means to begin playing of the selected record, said second cam means operating said cam follower means to open said circuit when the selected record has been played.

25. A record changer assembly as set forth in claim 19 further including: a drive assembly interconnecting said fourth cam means and said tone arm to move said tone arm axially relative to said turntable, said drive assembly including a shaft member positioned in a substantially parallel relationship with a central axis of said turntable and a linkage means in operating engagement with said fourth cam means to move said shaft member and said tone arm axially relative to said turntable to selectively engage said tone arm with a record positioned on said turntable.

26. A record transfer assembly for transporting a record from a record storage structure to a turntable, said record transfer assembly comprising: a frame means for securely engaging a selected record in the record storage structure; and a differential gear means connected to said frame means for rotating the frame means to position the record in a predetermined orientation on the turntable.

27. A record transfer assembly as set forth in claim 26 further including: a first stop member positioned adjacent to said differential gear means, said first stop member being selectively engageable with a first gear means of said differential gear means to rotate said frame means in a first direction relative to said turntable to position a first side of the selected record outwardly on the turntable; and a second stop member positioned adjacent to said differential gear means, said second stop member being selectively engageable with a second gear means of said differential gear means to rotate said frame means in a second direction relative to said turntable to position a second side of the selected record outwardly on the turntable.

28. A record changer assembly comprising: a base means; a record storage structure supported by said base means; a turntable supported by said base means; a record transfer assembly for transporting a record from said record storage structure to said turntable; said record transfer assembly including a frame means for securely engaging a selected record in said record storage structure and a differential gear means connected to said frame means for rotating the frame means to position the record in a predetermined orientation on the turntable; and a drive means for moving said turntable relative to said frame means to disengage the selected record from the record transfer assembly when the record has been positioned on the turntable.

29. A record changer assembly as set forth in claim 28 wherein: said record storage structure has a generally circular shape with a central axis of the record storage structure extending in a generally parallel relationship with a central axis of said turntable.

30. A record changer assembly comprising: a base means; a generally circular record magazine rotatably supported by said base means for holding a plurality of records; a tone arm supported by said base means; a turntable supported by said base means for rotating a record relative to said tone arm; a record transfer assembly for transporting a selected record from said record magazine to said turntable, said record transfer assembly including a frame means for securely engaging a selected record in said record storage structure and a differential gear means connected to said frame means for rotating the frame means to position the record in a predetermined orientation on the turntable; a first stop member supported by said base means for selectively engaging a first gear means of said differential gear means to rotate said frame means in a first direction relative to said turntable to position a first side of the selected record for engagement with said tone arm; a second stop member supported by said base means for selectively engaging a second gear means of said differential gear means to rotate said frame means in a second direction relative to said turntable to position a second side of the selected record for engagement with said tone arm; and control means supported by said base means for controlling the operation of the record changer assembly, said control means being connected in a driving relationship to said record transfer assembly to move said frame means and the selected record relative to said base means to position the selected record on said turntable, said control means being connected to said first and second stop members to selectively position said stop members for engagement with said differential gear means to position the selected record in a predetermined orientation on said turntable, said control means also being connected to said turntable for moving said turntable relative to said frame means to disengage the selected record from said record transfer assembly when the record has been positioned in a predetermined orientation on said turntable, and said control means being connected to said tone arm to move said tone arm into engagement with the selected record.

31. A method of positioning a record for rotation on a turntable of a phonograph comprising the steps of: engaging the record with a frame means; positioning the record on the turntable with the frame means; and disengaging the record from the frame means by moving the turntable relative to the frame means.

References Cited

UNITED STATES PATENTS

| | | |
|---|---|---|
| 1,970,417 | 8/1934 | Dahlstrom. |
| 2,697,607 | 12/1954 | Vanderzee et al. |
| 2,839,305 | 6/1958 | Andres. |

HARRY N. HAROIAN, Primary Examiner